US008750894B1

(12) United States Patent
Stogaitis et al.

(10) Patent No.: US 8,750,894 B1
(45) Date of Patent: Jun. 10, 2014

(54) SYSTEM AND METHOD OF LOCATION ESTIMATION BASED ON INTERSECTIONS AND RANGE ESTIMATION

(75) Inventors: Marc Stogaitis, San Mateo, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 507 days.

(21) Appl. No.: 12/821,463

(22) Filed: Jun. 23, 2010

(51) Int. Cl.
*H04W 24/00* (2009.01)
*H04W 4/00* (2009.01)
*H04B 7/00* (2006.01)
*H04B 7/204* (2006.01)

(52) U.S. Cl.
USPC .................... 455/456.1; 455/422.1; 455/41.2; 370/338; 370/325

(58) Field of Classification Search
USPC ...................................................... 455/456.1
See application file for complete search history.

(56) References Cited

U.S. PATENT DOCUMENTS

| 8,219,112 | B1 | 7/2012 | Youssef et al. | |
|---|---|---|---|---|
| 2008/0080441 | A1* | 4/2008 | Park et al. | 370/338 |
| 2008/0214205 | A1* | 9/2008 | Alles et al. | 455/456.1 |
| 2009/0323530 | A1* | 12/2009 | Trigui et al. | 370/235 |
| 2010/0159832 | A1* | 6/2010 | Lagrange et al. | 455/41.2 |
| 2010/0285790 | A1* | 11/2010 | Baliosian et al. | 455/422.1 |
| 2012/0028652 | A1* | 2/2012 | Wirola et al. | 455/456.1 |

FOREIGN PATENT DOCUMENTS

WO    WO-2007072400    * 6/2007

OTHER PUBLICATIONS

Adel Amin Youssef, Zhengrong Ji, Michael Jesse Chu, Ravi Jain, and Steven John Lee, Accuracy Analysis of Wireless Base Station Location, U.S. Appl. No. 12/324,486, 2008, 33 pages.

* cited by examiner

*Primary Examiner* — Timothy Pham
(74) *Attorney, Agent, or Firm* — Lerner, David, Littenberg, Krumholz & Mentlik, LLP

(57) ABSTRACT

Systems and methods are provided for estimating the locations and coverage ranges of wireless transmission stations based on the existing location and coverage range data. The system divides the transmitting stations into a plurality of pairs and estimates new coverage range and location for each transmitting station in each pair based on confidence level, distance to another transmitting station in the same pair and coverage range overlap with other transmitting stations. Systems and methods are provided to estimate the location and accuracy range of the location of a client device based on the intersections of the coverage ranges of wireless transmission stations detected by the client device. The system repeatedly removes the transmission station with fewer number of intersections from further process if the number of intersections for each remaining transmission station is not the same.

20 Claims, 28 Drawing Sheets

(circle overlap has more accurate position)

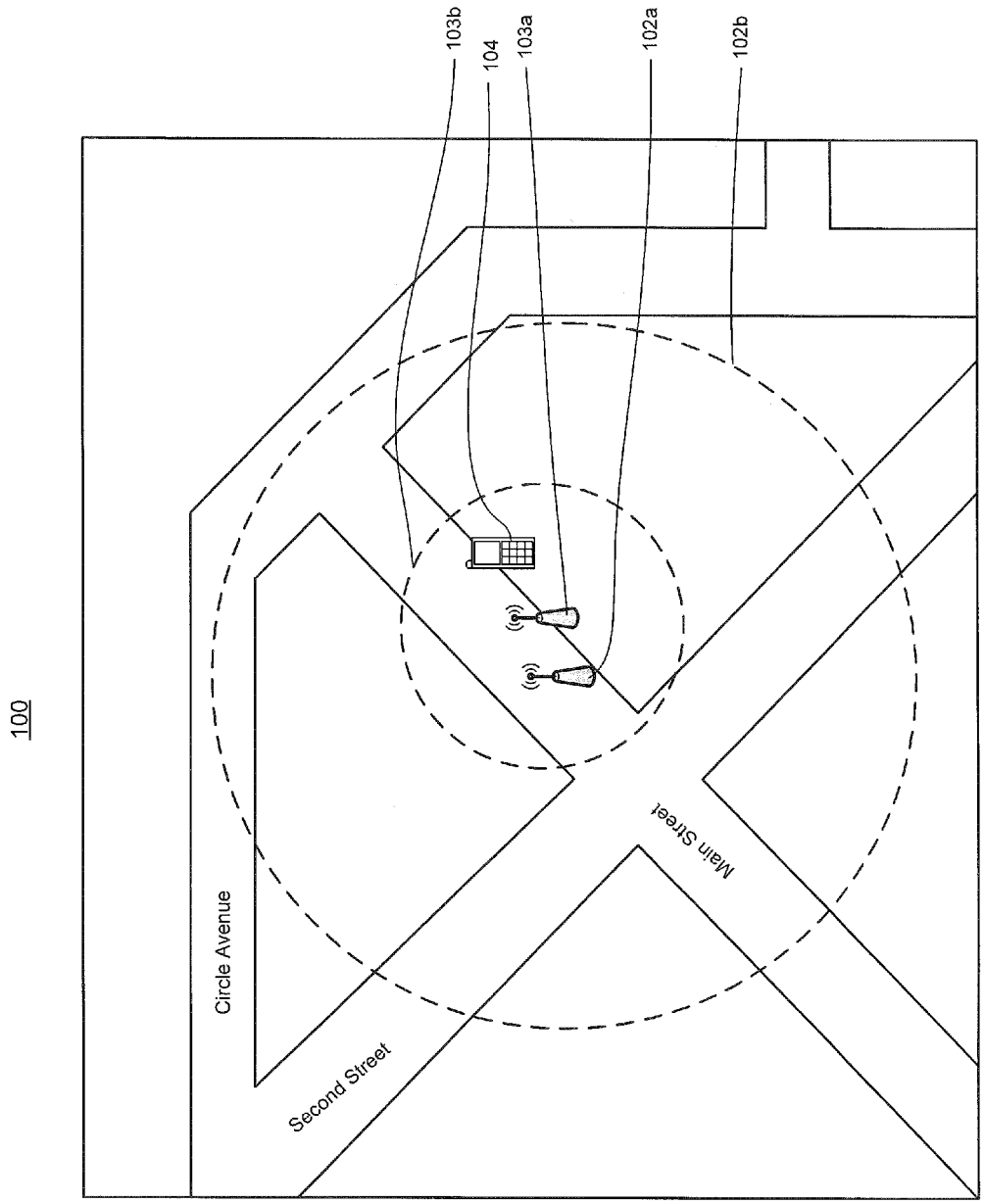
FIG. 1A (server fails to return location)

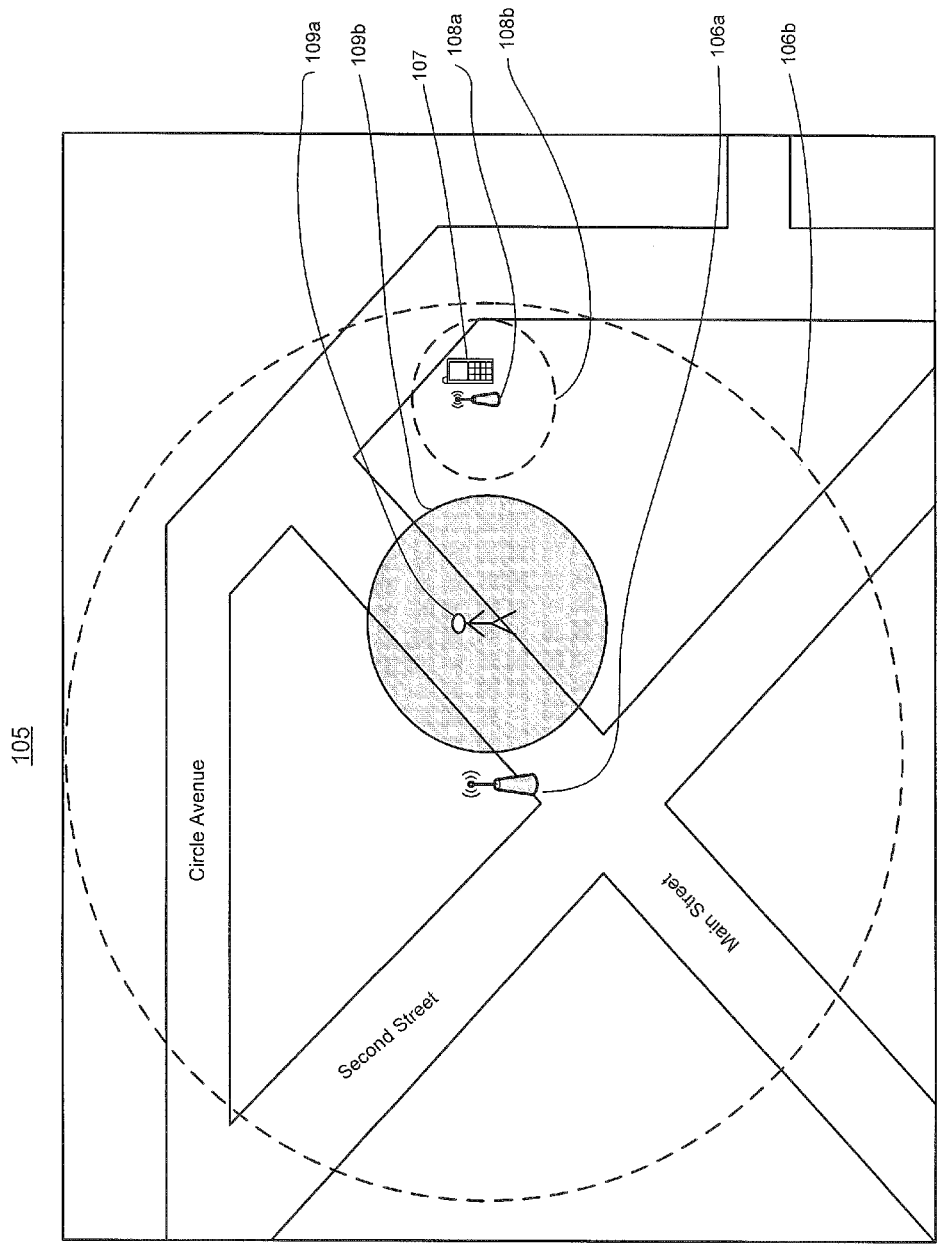
FIG. 1B (circle overlap has more accurate position)

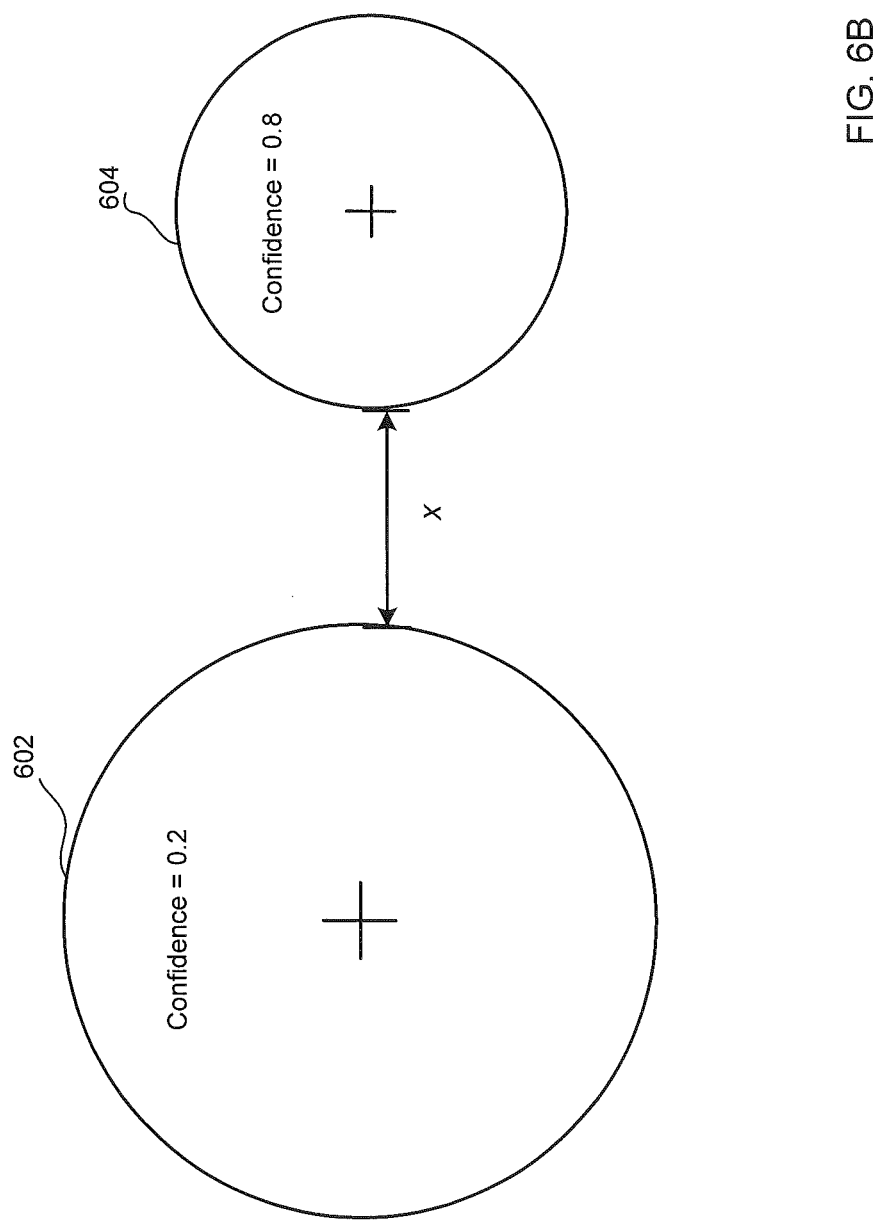

SYSTEM AND METHOD OF LOCATION ESTIMATION BASED ON INTERSECTIONS AND RANGE ESTIMATION

BACKGROUND OF THE INVENTION

1. Field of the Invention

The present invention relates generally to location estimation systems and methods. More particularly, the present invention relates to estimating a location of a client device.

2. Description of Related Art

The approximate location of a client device within the coverage ranges of a set of WiFi access points can be estimated based on the existing information of the locations and ranges of the WiFi access points stored in a pre-computed database.

However, the information in the WiFi access points database may not be accurate due to various reasons. Often, the locations and coverage ranges of the access points in the database are only estimated values that do not accurately reflect the true location and range of the access point. The database may also contain invalid access points locations as access points were removed from the original location and the location data in the database is not updated timely.

Some location estimation systems adopt an iterative process to calculate the centroid of all the access points detected by the client device. To determine the accuracy of the estimated location, these systems compute the average of the estimated coverage range of all the access points used in the calculation. Then, if the accuracy is beyond a certain threshold, those access points that are furthest from the computed centroid are discarded and the system re-calculates the centroid and accuracy. If the accuracy is below the threshold, the computed centroid is designated as the location of the device and returned to the client device with the accuracy. If many access points have been removed from the calculation after many iterations, and the estimated accuracy is still over the acceptable threshold, the location estimation algorithm does not return a location to the client device.

The above computation to determine the centroid and the accuracy of the location to return largely depends on the average of the accuracy of the locations and ranges of the access points used in the computation. As such, the limitations of the above approach are evident when the locations and ranges in the database are inaccurate, due to, for example, either insufficient spatial samples or samples with large spatial noises collected in the past.

Usually there are two types of undesirable errors with the existing WiFi signal coverage. First, the centroid of the signal coverage may be biased towards the edge of the signal's true coverage due to insufficient and biased samples. Second, the coverage area of a signal may be overestimated if the GPS locations collected through the client device are inaccurate (e.g., with noises in the range of hundreds of meters or even kilometers), or decoupled from the current signal scan in time so the coverage data is stale. In addition, large spatial errors may occur if the client device is on the move.

SUMMARY OF THE INVENTION

Aspects of the invention provide systems and methods of location estimation based on intersections of coverage ranges of access points and optimization of location and coverage range data of access points.

In one embodiment, a method is provided for estimating a location of a device in a wireless network including a plurality of transmission stations. The method comprises determining, for each transmission station in a set of transmission stations detected by a device, a number of intersections with other ones of the transmission stations in the set based on a coverage range of each transmission station in the set. The method also comprises identifying a given one of the transmission stations in the set having a least number of intersections; removing the identified given transmission station from further estimation if the number of intersections for each remaining transmission station in the set is not the same; and determining the location of the device and an accuracy range of the location based on the intersections of all remaining transmission stations in the set.

In one example, determining the location of the device includes determining a centroid of the intersection of all of the remaining transmission stations to be the location of the device.

In another example, determining the accuracy range of the location includes determining a circular area covering the intersection, and the determined location being assigned as the center of the circular area.

In a further example, determining the location of the device comprises dividing the remaining transmission stations into a first group and a second group. In each group all transmission stations intersect with each other, and the transmission stations in one group do not intersect with the transmission stations in the other group. Determining the location of the device also comprises determining a centroid of the intersection in each group; determining a circular area in each group covering the intersection where the circular area having the determined centroid as its center; and determining a new centroid between edges of the determined circular areas in each group as the location of the device.

In one alternative, the method comprises determining a new circular area to be the accuracy range of the determined location. The determined location is the center of the new circular area, and the new circular area covers the circular area from whichever group that is the closest to the determined location.

In another alternative, the method comprises sending the determined location and the accuracy range for display on the device.

In accordance with another embodiment, a method is provided for estimating coverage range and location for a transmitting station in a wireless network having a plurality of transmitting stations. The method comprises dividing the plurality of transmitting stations into a plurality of pairs based on existing coverage range and location data, where each transmitting station is in at least one of the plurality of pairs. The method also comprises estimating a new coverage range and a new location for each of the plurality of transmitting stations based on a confidence level associated with each transmitting station, a distance to another transmitting station in a given one of the plurality of pairs, and a coverage range overlap with other ones of the transmitting stations.

In one example, the coverage ranges of the transmitting stations in each pair do not overlap.

In another example, estimating the new location for a given one of the transmitting stations comprises calculating a distance and a direction to shift the given transmitting station towards the other transmitting station in a given pair. The distance is proportional to the confidence level of the given transmitting station and inversely proportional to the distance to the other transmitting station in the given pair.

In a further example, the method comprises summing the distances and directions calculated for each transmitting station in each pair.

In one alternative, estimating the new coverage range for a given one of the transmitting stations comprises determining an overlap of the given transmitting station with other transmitting stations. The overlapping transmitting stations include transmitting stations on a neighbor list of the given transmitting station and transmitting stations not on the neighbor list.

In another alternative, the method comprises adjusting the new coverage range for the given transmitting station by increasing the new coverage range for the transmitting station by a first amount if the overlap with the transmitting stations on the neighbor list is below a predetermined threshold, and decreasing the new coverage range by a second amount if the overlap with the transmitting stations not on the neighbor list is above a predetermined threshold.

In a further alternative, the method comprises measuring the distance between every two transmitting stations after adjusting the coverage range; summing all the measured distances; and determining if the sum of the measured distances is above a predetermined threshold.

In yet another alternative, the method comprises setting the first amount and the second amount in each round of estimation based on the sum of the measured distances.

In yet another example, the method comprises determining a confidence level for each transmitting station prior to estimating the new coverage range and the new location.

In accordance with a further embodiment, an apparatus is provided for estimating a location of a device in a wireless network including a plurality of transmission stations. The apparatus comprises memory for storing coverage range information for the plurality of transmission stations. The apparatus also comprises a processor configured to determine for each transmission station in a set of the plurality of transmission stations, a number of intersections with other transmission stations based on a coverage range of each transmission station in the set. The processor is also configured to identify a given one of the transmission stations in the set having a least number of intersections; remove the identified given transmission station from further estimation if the number of intersections for each remaining transmission station in the set is not the same; and determine the location of the device and an accuracy range of the location based on the intersections of all remaining transmission stations in the set.

In one example, determining the location of the device includes determining a centroid of the intersection of all remaining transmission stations to be the location of the device.

In another example, determining the accuracy range of the location comprises determining a circular area covering the intersection, and the determined location is assigned as the center of the circular area.

In a further example, determining the location of the device comprises dividing the remaining transmission stations into a first group and a second group, where in each group all transmission stations intersect with each other and the transmission stations in one group do not intersect with the transmission stations in the other groups. Determining the location of the device also comprises determining a centroid of the intersection in each group; determining a circular area in each group covering the intersection where the circular area has the determined centroid as its center; and determining a new centroid between edges of the determined circular areas in each group as the location of the device.

In one alternative, determining the accuracy range of the determined location comprises determining a new circular area. The determined location is the center of the circular area, and the new circular area covers the circular area from whichever group that is the closest to the determined location.

In another alternative, the processor is further configured to send the determined location and the accuracy range for display on the device.

In a further alternative, the processor is further configured to receive data from the device. The data includes identifiers of the set of the plurality of transmission stations detected by the device.

In accordance with yet another embodiment, an apparatus is provided for estimating coverage range and location for a transmitting station in a wireless network having a plurality of transmitting stations. The apparatus comprises memory for storing coverage range information and location information for the plurality of transmission station. The apparatus also comprises a memory configured to divide the plurality of transmitting stations into a plurality of pairs based on the stored coverage range and location data. Each transmitting stations is in at least one pair. The processor is also configured to estimate a new coverage range and location for each transmitting station based on a confidence level associated with each transmitting station, a distance to another transmitting station in a given pair, and a coverage range overlap with other transmitting stations.

In one example, the coverage ranges of the transmitting stations in each pair do not overlap.

In another example, estimating the new location for a given one of the transmitting stations comprises calculating a distance and a direction to shift the given transmitting station towards the other transmitting station in a given pair. The distance is proportional to the confidence level of the given transmitting station and inversely proportional to the distance to the other transmitting station in the given pair.

In a further example, the processor is further configured to sum the distances and directions calculated for each transmitting station in each pair.

In one alternative, estimating the new coverage range for a given one of the transmitting stations comprises determining an overlap of the given transmitting station with other transmitting stations. The overlapping transmitting stations includes transmitting stations on a neighbor list of the given transmitting station and transmitting stations not on the neighbor list.

In another alternative, the processor is further configured to adjust the new coverage range for the given transmitting station by increasing the new coverage range for the transmitting station by a first amount if the overlap with the transmitting stations on the neighbor list is below a predetermined threshold, and decreasing the new coverage range by a second amount if the overlap with the transmitting stations not on the neighbor list is above a predetermined threshold.

In a further alternative, the processor is further configured to measure the distance between every two transmitting stations after adjusting the coverage range; sum all the measured distances; and determine if the sum of the measured distances is above a predetermined threshold.

In yet another alternative, the processor is further configured to set the first amount and the second amount in each round of estimation based on the sum of the measured distances.

In yet another example, the processor is further configured to determine a confidence level for each transmitting station prior to estimating the new coverage range and the new location.

In accordance with one embodiment, a method is provided for estimating a location of a device in a wireless network including a plurality of transmission stations. The method comprises dividing the plurality of transmitting stations into a plurality of pairs based on existing coverage range and location data, where each transmitting station is in at least one pair and coverage ranges of the transmitting stations in each pair do not overlap. The method also comprises estimating a new coverage range and a new location for each of the plurality of transmitting stations based on a confidence level associated with each transmitting station, a distance to another transmitting station in a given one of the plurality of pairs, and a coverage range overlap with other ones of the transmitting stations. The method also comprises detecting, at the device, a set of the plurality of transmission stations; determining, for each transmission station in the set, a number of intersections with other ones of the transmission stations in the set based on the estimated new coverage range of each transmission station in the set. The method further comprises identifying a given one of the transmission stations in the set having a least number of intersections; removing the identified given transmission station from further estimation if the number of intersections for each remaining transmission station in the set is not the same; and determining the location of the device and an accuracy range of the location based on the intersections of all remaining transmission stations in the set.

In one example, estimating the new location for a given one of the transmitting stations comprises calculating a distance and a direction to shift the given transmitting station towards the other transmitting station in a given pair. The distance is proportional to the confidence level of the given transmitting station and inversely proportional to the distance to the other transmitting station in the given pair. Estimating the new location for a given one of the transmitting stations also comprises summing the distances and directions calculated for each transmitting station in each pair.

In another example, determining the location of the device includes determining a centroid of the intersection of all remaining transmission stations to be the location of the device. Determining the accuracy range of the location includes determining a circular area covering the intersection. The determined location is assigned as the center of the circular area.

In a further example, determining the location of the device comprises dividing the remaining transmission stations of the set into a first group and a second group. In each group all transmission stations intersect with each other, and the transmission stations in the first group do not intersect with the transmission stations in the second group. Determining the location of the device also comprises determining a centroid of the intersection in each group; determining a circular area in each group covering the intersection. The circular area has the determined centroid as its center. Determining the location of the device further comprises determining a new centroid between edges of the determined circular areas of the first and second groups as the location of the device; and determining a new circular area to be the accuracy range of the determined location. The determined location is assigned as the center of the new circular area, and the new circular area covers the circular area from whichever group that is the closest to the determined location.

BRIEF DESCRIPTION OF THE DRAWINGS

FIG. 1A is a pictorial diagram of a scenario where a current location estimation system fails to return a location.

FIG. 1B is a pictorial diagram where a current location estimation system returns a location that is off from the client device's actual position.

FIG. 6A-L illustrates scenarios in accordance with aspects of the invention.

DETAILED DESCRIPTION

Figure 2A:
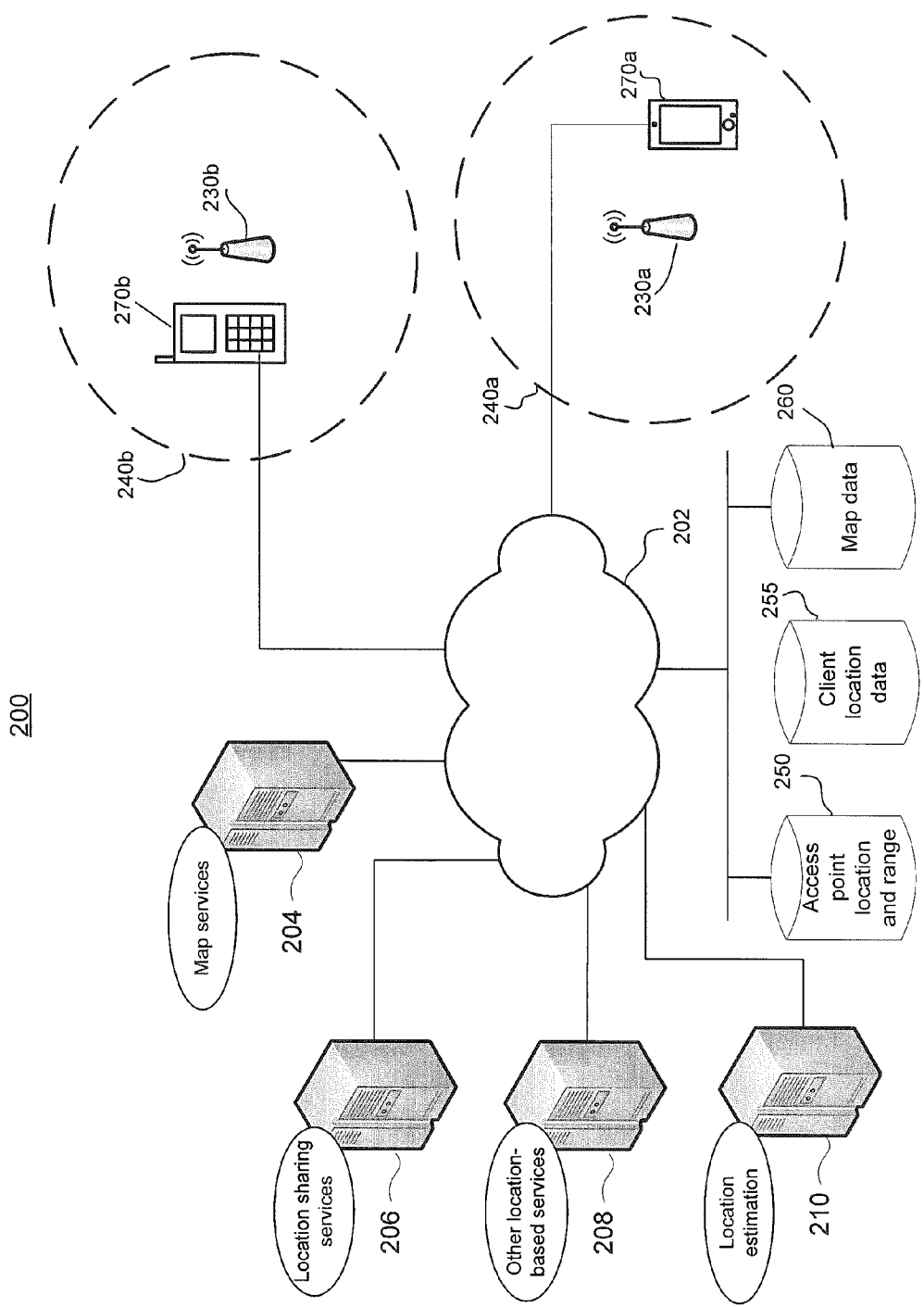
FIG. 2A is a functional diagram of a system in accordance with aspects of the invention.

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

The accuracy of a location estimation system depends on the accuracy of the access point location and coverage range data. However, even if the locations and ranges in the database are accurate approximation to real values, the system may still fail to estimate the location of a client device or generate an inaccurate estimation when the ranges of the access points used in the computation differ greatly in size. For example, FIG. 1A illustrates a scenario 100 where a high powered WiFi access point 102a has a large coverage range circle 102b (e.g., 1,000 to 2,000 meters) and a low powered access point 103a has a relatively small coverage range circle 103b. A client device 104 is located within both the ranges of 102b and 103b. In this scenario, the location estimation system may fail to estimate and return a location to the client device because the computed average accuracy of the access points 102a and 103a is heavily influenced by the large range of access point 102a and the biased average accuracy may always end up being over the threshold value for returning a location.

FIG. 1B illustrates a scenario 105 where the current location estimation system returns a location that is off from the user's actual position. In scenario 105, a high powered WiFi access point 106a has a large coverage range circle 106b that completely encircles the small coverage range circle 108b of a low powered access point 108a. Here, the system may, instead of returning the actual location of user device 107, return a center location 109a with a location circle size of 109b for the user device. This is due to the heavy influence of the large range of 106a in the computation.

One approach to increasing the accuracy of the location to be returned in the above situations where the ranges of the access points are of different sizes is to use a weighted centroid. This approach assigns heavier weight for access points of smaller range sizes and therefore the computation will pull the center location (e.g., 109a) toward the smaller range access points (e.g., 108a). While the weighted centroid approach results in a center location that is closer to the user device's actual location than a straight centroid estimation, this approach does not address the problem associated with estimating the size of the location circle to be returned to the user device. When a smaller circle is completely inside a larger circle and the actual location of the user device is the center of the small circle, the weighted centroid approach may also return a sub-optimal centroid by pulling the estimated location slightly off the center of the smaller circle towards the center of the larger circle.

To improve the accuracy of the location circle size to be returned to the user, the tightest fitted circle that was used in the location estimation may be used. This approach computes the centroid of the location with one of the centroid techniques mentioned above, and set the location circle size of the computed location to the size of the smallest access points used in the centroid calculation. However, this approach depends on the accuracy of the access point ranges stored in the database, and is susceptible to being biased by a single access point that its estimated range is smaller than its actual range. Thus, this approach may return an accuracy circle that is too small and does not cover the user device's actual location.

As such, an approach that improves both the accuracy of the centroid location computation and the accuracy of the estimated ranges of access points (and therefore the accuracy of the returned location) is desired.

In accordance with aspects of the invention, systems and methods are provided to estimate the location for client device in a wireless network. In one scenario, the client device sends a location query to the system along with a scanned list of WiFi access points based on the WiFi signals detected by the client device. The system retrieves existing location and coverage range data of the received WiFi access points from a database. Then the system improves the accuracy of the existing locations and coverage ranges of the access points through an inverse error propagation process to detect and rectify the errors in the location and range data. The system groups close but non-overlapping access points into pairs, determines the new location of the access points in each pair based on the measured confidence level and the gap distance between the adjacent access points, and adjusts the location accordingly.

After the adjustment, the system determines the degree of overlap of each access point with its neighboring access points and adjusts the coverage range accordingly. Then the system determines the global error on the basis of the sum of gap distances between pairs of adjacent coverage ranges. The above process is iterated until a delta change in the locations and coverage ranges or the global error falls below a threshold.

In accordance with other aspects of the invention, systems and methods are provided to estimate the location of a client device and the accuracy range of the location by estimating the intersections of the improved WiFi coverage ranges. For instance, the system may receive a location query from a client device. The location query includes a scanned list of WiFi access points based on the WiFi signals detected by the client device. The system may use the improved locations and coverage ranges of the access points from the process discussed above to determine for each access point the number of intersections with other access points. The system then enters a loop process to remove an access point having the fewest number of intersections from further processing until all the overlapping access points have an equal number of intersections. Then the system determines the location of the client device and an accuracy range of the location based on the intersection. The system returns the estimated location centroid and accuracy range to the client device.

As shown in FIG. 2A, a system 100 in accordance with aspects of the invention includes servers 204, 206, 208 and 210, client devices 270a-b, a network 202, databases 250, 255 and 260, and access points 230a-b each with a respective coverage range 240a-b.

Server 210 may be a computer configured to perform various functions related to location estimation for client devices. Although only one server for performing location estimation is depicted in FIG. 2A, it should be noted that the various functions related to location estimation may be performed on different servers that are distributed through the network 202. Server 210 is connected to one or more distributed databases 250, 255 and 260 through the network 202. The distributed databases may store various types of data such as map data, user location data, WiFi access point location and coverage range data within a certain geographical area.

The locations estimated by server 210 may be used by various location-based service providers to provide location-based services to the client devices over network 202. By way of example, service provider 204 may provide map services so that users may view, from a map interface, their current or past locations. Service provider 206 may provide location sharing services so that a user may share his/her location with friends and view other peoples' locations. Service provider 208 may provide any other type of location-based services, such as client specific weather services, location-aware advertising services and background aggregate statistical analysis of past locations.

Figure 2B:
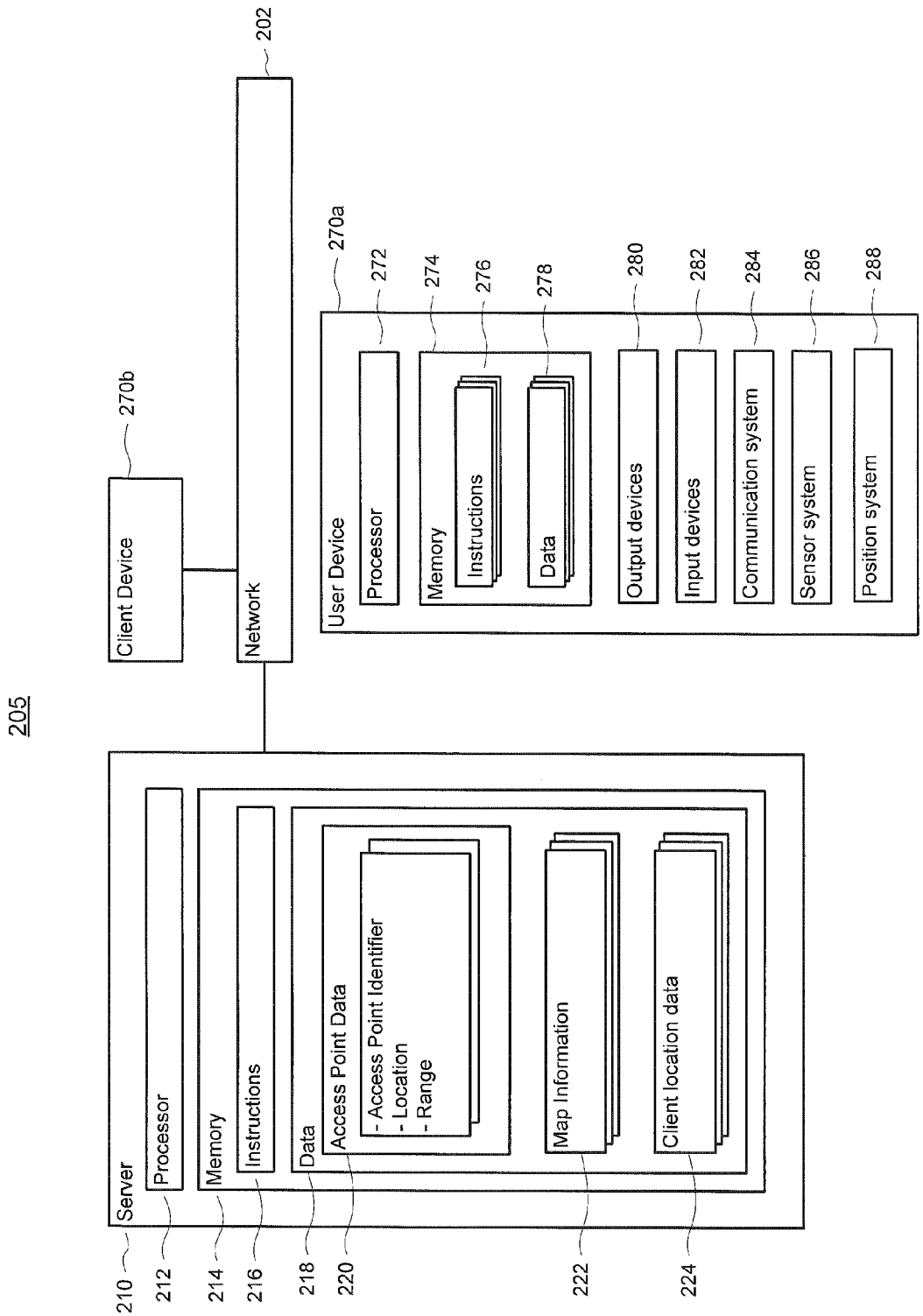
FIG. 2B is a functional diagram of a system in accordance with aspects of the invention.

FIG. 2B illustrates that the computer server 210 may contain a processor 212, memory 214 and other components typically present in general purpose computers. The processor 212 may be any commercial processor, such as processors from Intel Corporation or Advanced Micro Devices. Alternatively, the processor may be a dedicated controller such as an ASIC.

Memory 214 stores information accessible by processor 212, including instructions 216 that may be executed by the processor 212 and data 218. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories.

The instructions 216 may be any set of instructions to be executed directly (such as binary machine code) or indirectly (such as scripts from any programming language) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions may include various programs or functions to perform location estimation for client devices.

Data 218 may be retrieved, stored or modified by processor 212 in accordance with the instructions 216. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

Server 210 may also store map-related information 222, at least a portion of which may be transmitted to a user device. For example, the server may store map tiles, where each tile is a map image of a particular geographic area. A single tile may cover an entire region such as a state in relatively little detail and another tile may cover just a few streets in high detail. The map information is not limited to any particular format. For example, the data may comprise street maps, satellite images, or a combination of these, and may be stored as vectors (particularly with respect to street maps) or bitmaps (particularly with respect to satellite images). The various map tiles are each associated with geographical locations, such that the server 210 is capable of selecting, retrieving and transmitting one or more tiles in response to receiving a geographical location from a user device.

The server may also store access point related data 220, for example, identifications for each respective access point locations, geographical locations of access points, and estimated coverage ranges of access points. By way of example, each access point within a particular network may have a unique number or other identifier that it broadcasts for use by cell phones, in which case the server may store the access point's ID, latitude/longitude position and an association between the two in data 220.

A single access point may emit multiple identifiers. By way of example, a WiFi wireless access point may broadcast both a Medium Access Control address (e.g., globally unique number such as a hexadecimal number (e.g., 00:23:32:23:51:AD) assigned by the access point's manufacturer to the individual access point) and an Service Set Identifier that identifies a particular network where the access point resides (e.g., a user may change the access point's default SSID to a text value such as "JoesPizzaWiFi"). The MAC address and the SSID of the same access point may thus be stored as two different signal identifiers. Other access points such as wireless base stations and wireless transmitters may broadcast other types of identification information.

Each access point may also be associated with multiple location identifiers, such as the geographic position of its physical location or the street address of the building where the access point is mounted on. The location data may also identify an access point's broadcast range.

The access point identification data, e.g., its MAC address, may be linked with location data (e.g., "00:23:32:23:51: AD—300m surrounding (37.423021°,−122.083939°)"). The access point's SSID address may also be paired with the street address of the building containing the access point (e.g., "GoogleNet—1600 Amphitheatre Parkway, Mountain View, Calif.").

Locations may be expressed within the system in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic location (e.g., lot and block numbers on survey maps). Moreover, a location may define a range of the foregoing, such as region surrounding a particular geographic position.

Locations may be translated from one reference system to another. For example, the server 210 may access a geocoder to convert a location identified in accordance with one reference system (e.g., a street address) into a location identified in accordance with another reference system (e.g., a latitude/longitude coordinate). In that regard, it will be understood that exchanging or processing locations expressed in one reference system may also be received or processed in other references systems as well.

Estimated locations 224 for client devices may also be stored in server 210. This location data may be expressed in a manner similar to those described above.

The databases 250, 255 and 260 storing the access point data 220, client location data 224, and map data 222 may reside on or be logically associated with the same server. In another example, these databases may reside on distributed servers which may be on different nodes of network 202.

Although FIG. 2B functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 210 may be at one node of network 202 and capable of directly and indirectly communicating with other nodes of the network. For example, computer 210 may comprise a web server that is capable of communicating with client devices 270a-b via the network 202 such that server 210 uses network 202 to transmit and provide information to a user using client device 270a. Server 210 may also comprise a plurality of computers that exchange information with different nodes of a network for the purpose of receiving, processing and transmitting data to the client devices; in this instance, the user devices will typically still be at different nodes of the network than any of the computers comprising server 210.

Network 202, and intervening nodes between server 210 and user devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few devices are depicted in FIGS. 2A-B, it should be appreciated that a typical system can include a large number of connected computers.

Each client device 270a-b may be configured similarly to the server 210, with a processor 272, memory 274, instructions 276 and data 278. Each client device 270a or 270b may have all of the components normally used in connection with a computer such as a central processing unit (CPU), memory (e.g., RAM and internal hard drives) storing data and instructions such as a web browser. The user device also includes, by way of example, output devices 280, input devices 282, communication system 284, sensor system 286, position system 288 and various other elements typically found on a client device, as well as all of the components used for connecting these elements to one another. For example, output devices may include an electronic display (e.g., a small LCD touch-screen), and audio output devices such as speakers. Input devices 282 may include a keyboard, touch-screen and/or microphone. Communication system 284 may include at least one RF antenna and/or other network interface devices.

Sensor system 286 may include an infrared sensor or an accelerometer. Position system 288 may include a GPS receiver.

Although the client devices 270a-b may each comprise a full-sized personal computer, they may alternatively comprise mobile devices capable of wirelessly exchanging data with a server over a network such as the Internet. By way of example only, client device 270a or 270b may be a wireless-enabled PDA or a cellular phoneme capable of obtaining information via the Internet. The user may input information using a small keyboard, a keypad or a touch screen. Indeed, client devices in accordance with the systems and methods described herein may comprise any device capable of processing instructions and transmitting data to and from humans and other computers including general purpose devices, network computers lacking local storage capability, etc.

A client device may be within the coverage area of one or more access points and be able to receive the signals emitted from the access points. For example, as shown in FIG. 2A, device 270a is within the coverage range 240a of access point 230a, and thus receives signals from the access point 230a. Device 270b is within the coverage range 240b of access point 230b, and receives signals from the access points 230b.

Figure 2C:
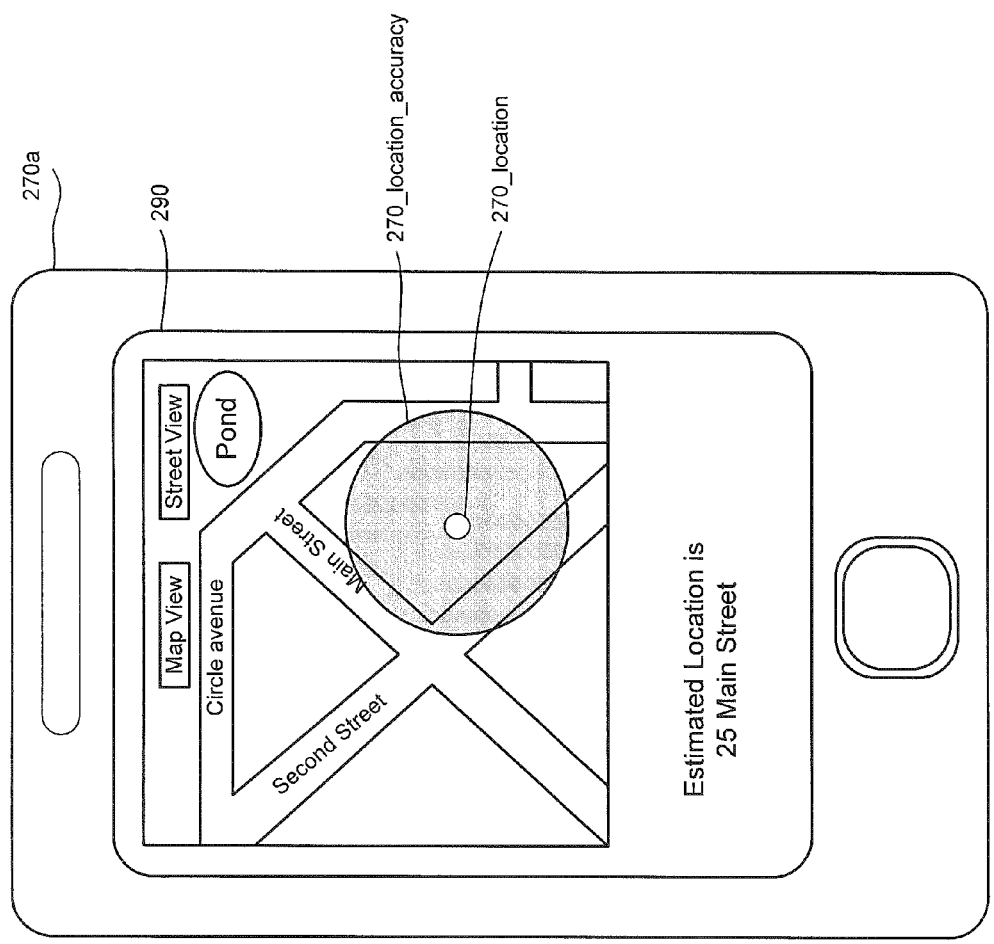
FIG. 2C is an illustration of a client device display in accordance with aspects of the invention.
Figure 2D:
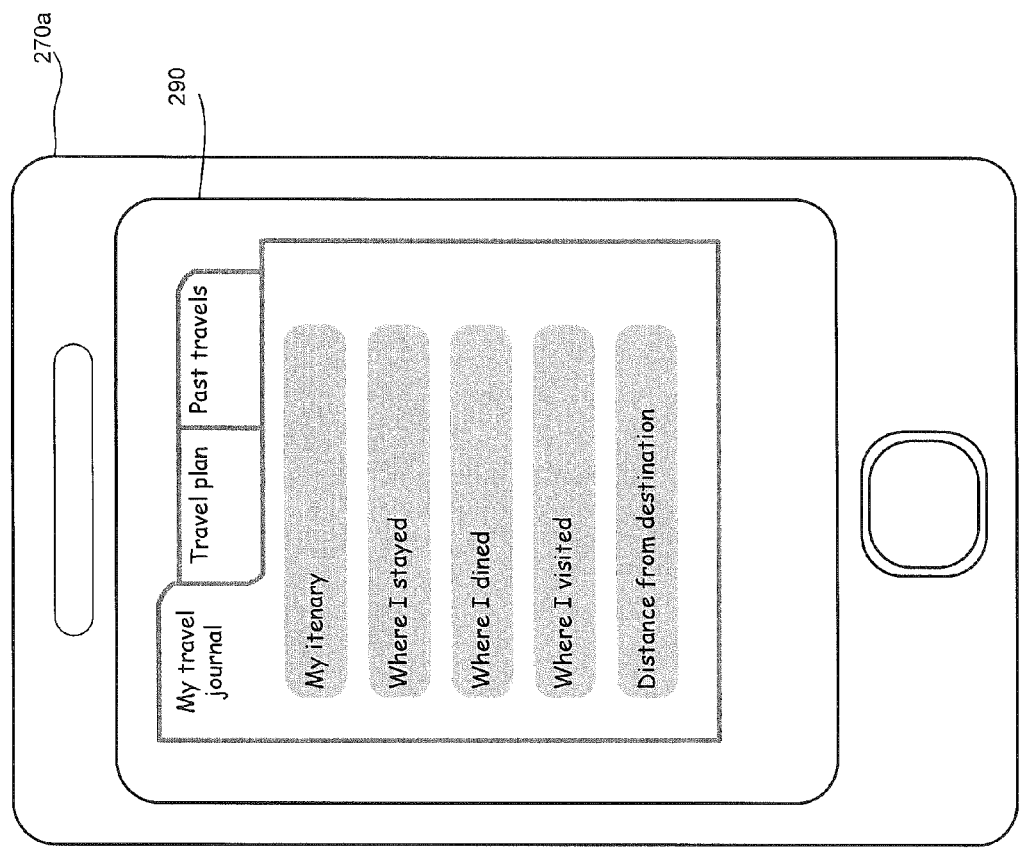
FIG. 2D is an illustration of a client device display in accordance with aspects of the invention.

FIG. 2C illustrates an exemplary display screen 290 of the client device 270a. As shown, the display screen 290 may display the current location of the device and an accuracy level estimated by the system. FIG. 2D illustrates another exemplary display screen 290 of the client device 270a. Here, the past locations estimated for the client device may be collected and analyzed by a location-based service, e.g., a travel journal application. The application may continuously collect location updates in a background process, perform reverse geocoding to obtain names of geographical places, analyze the aggregate results and publish the statistics through a user interface.

Operations in accordance with aspects of the invention will now be described. It should be understood that the following operations do not have to be performed in the precise order described below. Rather, various operations can be handled in reverse order or simultaneously.

Figure 3A:
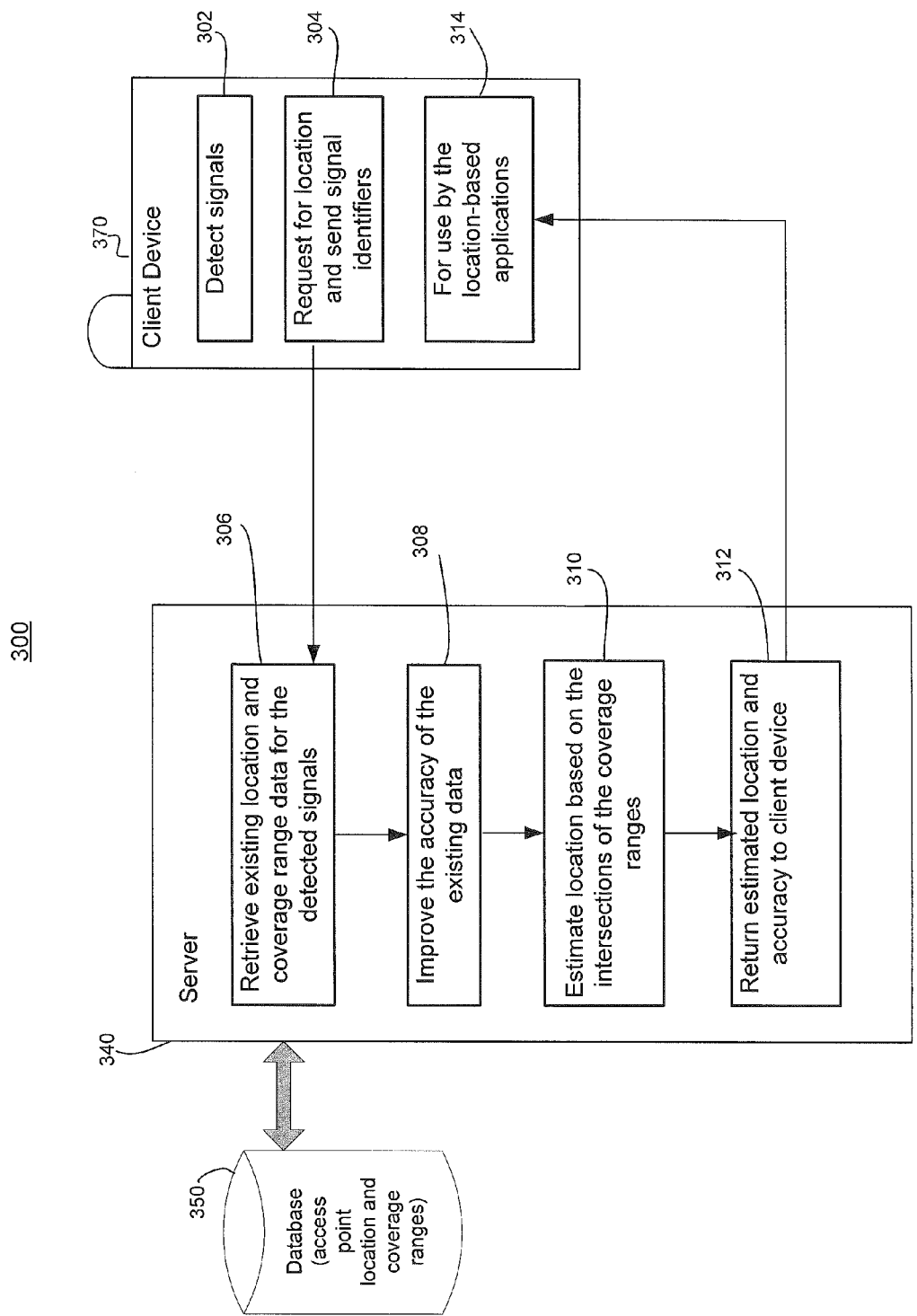
FIG. 3A is a functional diagram in accordance with aspects of the invention.

FIG. 3A illustrates a functional diagram in accordance with aspects of the invention. In block 302, client device 370 may continuously scan for nearby WiFi access points and detect one or more signals transmitted from one or more WiFi access points. Each of the WiFi signals detected by the client device contains at least one WiFi identification, such as a MAC address and an SSID. In block 304, the client device makes a request for location to the server 310. This request may be originated by a user of the client device through an input interface or may be initiated by the client device, e.g., as part of a periodic location update process. Along with the location query, the client device 370 also sends the list of WiFi access points detected by the device.

In block 306, server 340 may retrieve data related to the WiFi access points contained in the location query from database 350. Database 350 may be a database that resides on the server 340, or may be a separate database. Data retrieved by the server may include existing pre-computed locations and ranges of the WiFi access points.

As discussed above, the pre-computed locations and ranges of WiFi access points may not be accurate and an improvement in accuracy may be needed. Thus, in block 308, the server may improve the accuracy of the retrieved data by minimizing the errors in the retrieved location and coverage range data.

In block 310, server 340 uses the improved data to estimate the client device's location through an iterative process of intersection calculations. In block 312, server 340 returns the estimated location and accuracy to the client device. In step 314, the location-based application(s) on the client device may utilize the estimated location to provide location-aware services, for example, displaying, through a map interface, the estimated location and the accuracy level of the location, as shown in FIG. 2C.

Although FIG. 3A shows that the location estimation and improvement to the existing WiFi location and coverage range data are both performed on the server 310, it should be noted that these operations may be performed on the client device 370. For example, the server may send the retrieved WiFi location and coverage range data to the client device and the client device may perform data improvements and location estimation. In another embodiment, the server may perform the data improvement function and send the improved data to the client device 370 where the location estimation is performed.

Figure 3B:
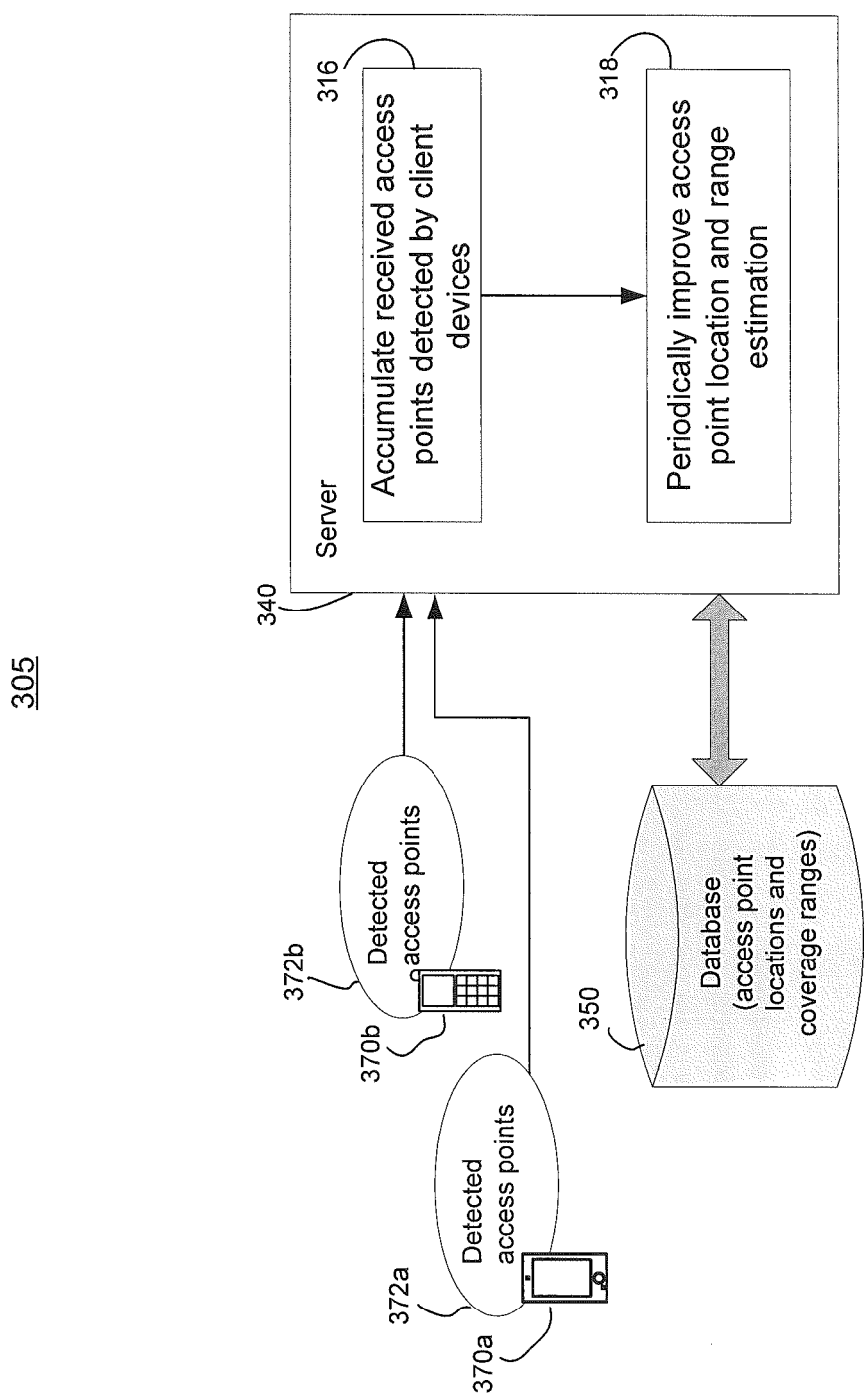
FIG. 3B is a functional diagram in accordance with aspects of the invention.

Furthermore, although FIG. 3A shows that improvement process happens after the system receives a location query and before the location estimation process, the improvement process may also be performed independently of any location query or location estimation. For example, the improvement process may accumulate a number of scanned WiFi access point lists from client devices over a period of time, and perform the data improvement periodically, such as shown in scenario 305 of FIG. 3B. As illustrated here, in block 316, server 340 may receive scanned access points from various types of mobile devices, such as detected access points 372a from device 370a and detected access points 372b from device 370b. The server may accumulate received access points and trigger a periodic optimization process of the access point location and range estimation in block 318. The criteria to trigger the optimization process may be based on a certain period of time, e.g., a week, or may be based on a sufficient amount of scanned access points accumulated, or may be other criteria.

The periodic optimization may be scheduled to run globally on server 340 for all the access point location and range data in database 350. Alternatively, local optimizations may be scheduled in between the global optimizations to improve the accuracy of certain access points, e.g., access points from a most recent scan. In this situation, local optimization may also be triggered by a location estimation query and be performed on either the server side or client side.

Figure 3C:
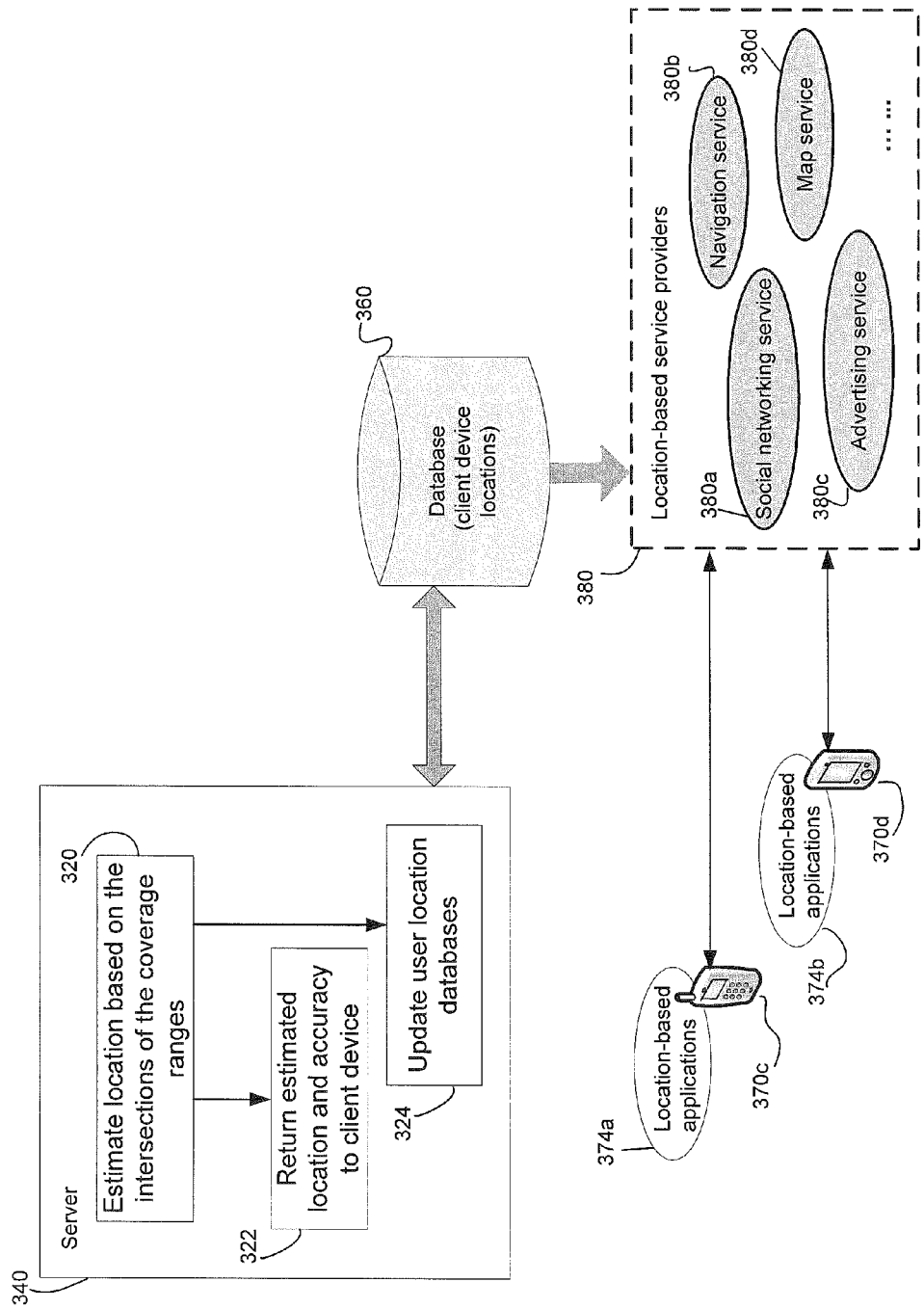
FIG. 3C is a functional diagram in accordance with aspects of the invention.

Similarly, client device location estimation based on intersections of the access point coverage ranges may be performed independently of access point optimization process, as illustrated in scenario 315 in FIG. 3C. In this scenario, server 340 may perform location estimation based on intersections in block 320 and return the location to a client device in block 322 like in scenario 300 in FIG. 3A. Additionally or alternatively, the server may, in block 324, update one or more location databases (e.g., database 360) that store client device locations with the newly estimated locations. The collections of this location data may be used by various types of location-based service providers 380 to provide services to client devices, such as 370c-d that run location-based applications like 374a-b. These service providers may include, e.g., social networking service 380a, navigation service 380b, advertising service 380c, map service 380d, and other types of location-based services.

Figure 4:
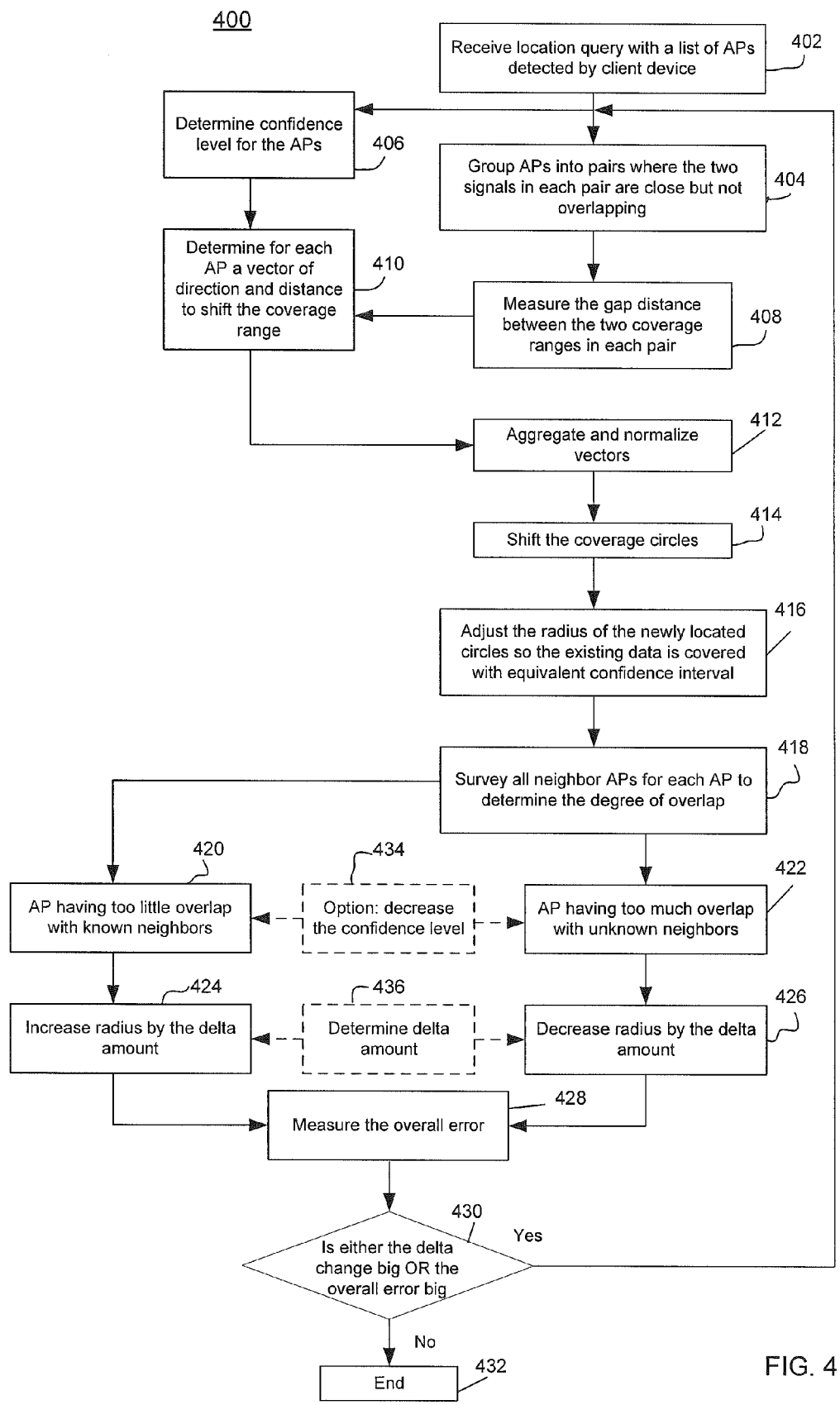
FIG. 4 is a flowchart in accordance with aspects of the invention.
Figure 5:
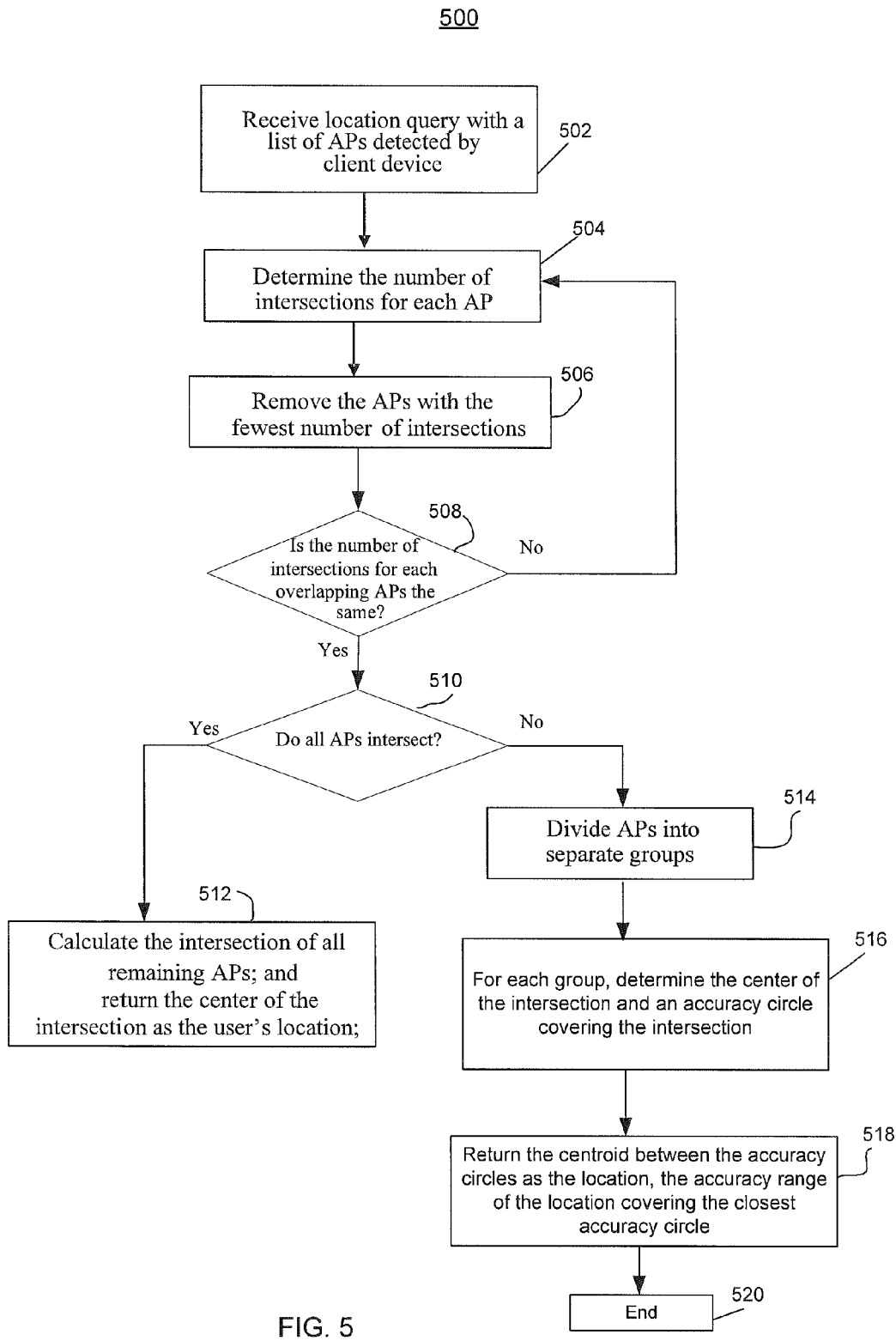
FIG. 5 is a flowchart in accordance with aspects of the invention.

FIGS. 4 and 5 are flowcharts for the data improvement process and location estimation process, respectively. FIG. 6A-M are pictorial examples of the data improvement process and FIG. 7A-G are pictorial examples of the location estimation process. Details of the two processes will be discussed by reference to these diagrams.

FIG. 4 shows a flowchart of a process 400 using an inverse error propagation model to detect and rectify the errors in the existing WiFi location and range data.

In step 402, the system performing the WiFi data improvement process receives a location query from a client device or otherwise initiates the improvement process using detected access point information. As noted above, the system may be a server or a client device. The query includes a list of WiFi access point detected by the client device.

In step 404, the system may identify pairs of WiFi access points that are apparently close but having non-overlapping ranges based on pre-computed location and coverage range data for these access points. The pre-computed location and coverage data may be retrieved from a database, such as database 250 shown in FIG. 2A.

Figure 6A:
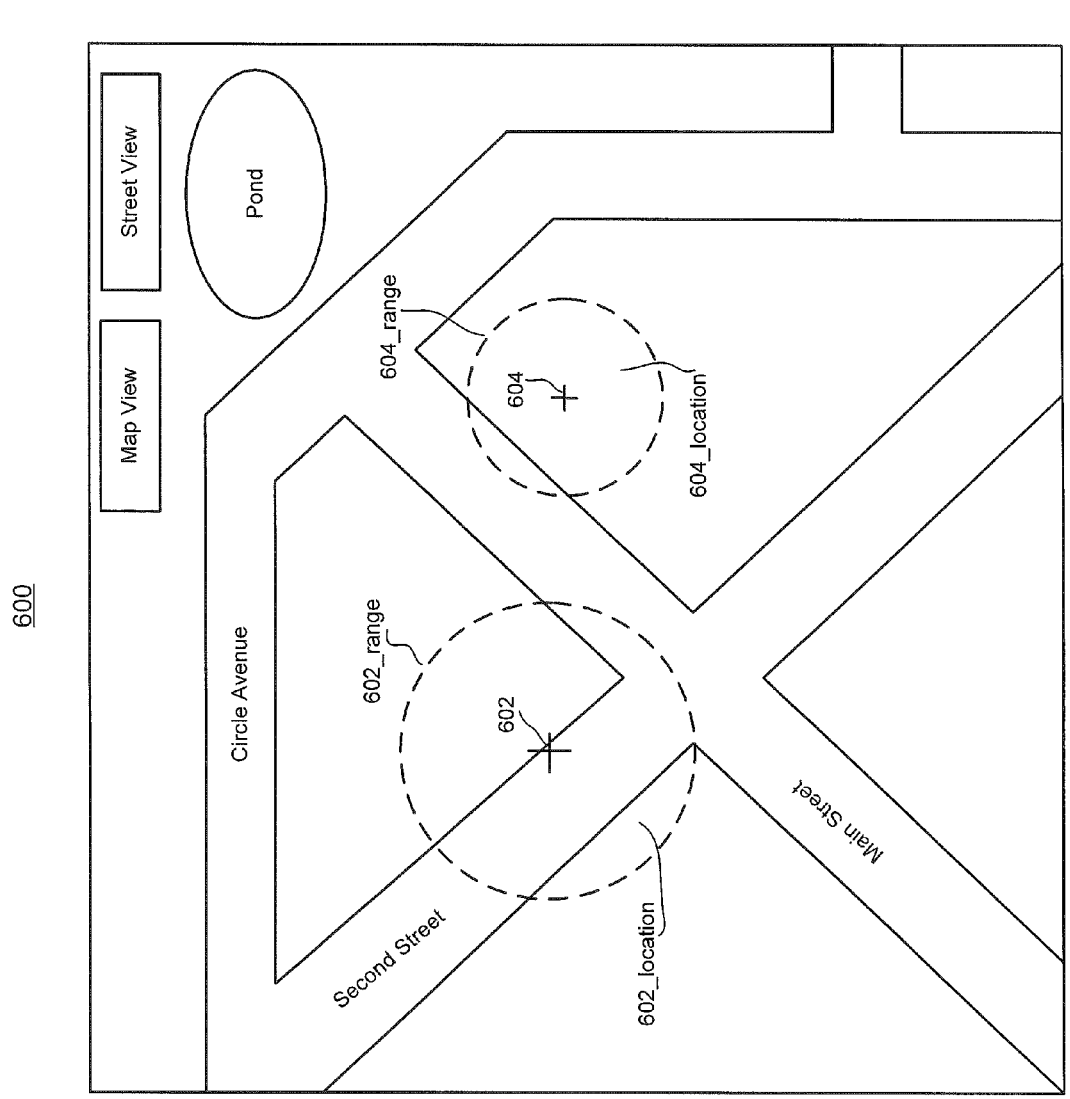

For example, as illustrated in FIG. 6A, the signals of WiFi access points 602 and 604 may be both detected by a client device and be sent as part of a scanned WiFi list to the system. However, the existing range values of 602_range and 604_range in the database do not show these two access points are overlapping. The threshold of the closeness of two access points to be grouped in a pair may be a function of the distance between the centroids of the access point coverage ranges, for example, 602_location and 604_location.

Then in step 406, the confidence level of each access point in each identified pair is determined. Various systems and methods may be used to calculate the confidence level. For example, utility functions of the prior GPS sample population could be used to determine the confidence level, and the samples could be weighted by duration and freshness of the collection, and the diversity of platforms, etc. Here the methods and systems of determining the confidence level for the access points described in U.S. patent application Ser. No. 12/324,486 are incorporated by reference. For example, FIG. 6B shows that access point 602 may be determined to have a confidence level 0.2 and access point 604 may have a confidence level 0.8.

Then in step 408, the gap distance between the two coverage circles 602 and 604 may be measured. Proceeding to step 410, the system determines a vector of direction and magnitude (distance) to shift the range circle for each access point. In other words, a vector of direction and magnitude to shift each range circle to a new location is calculated. For example, the vector for access point 602 is $V_{602}=[d_{602}, m_{602}]$, where $d_{602}$ is the direction to shift circle 602 and $m_{602}$ is the magnitude (distance) to shift circle 602. The vector may be represented in various formats, for example, may be latitude/longitude coordinates of the new location of the access point's centroid.

Figure 6C:
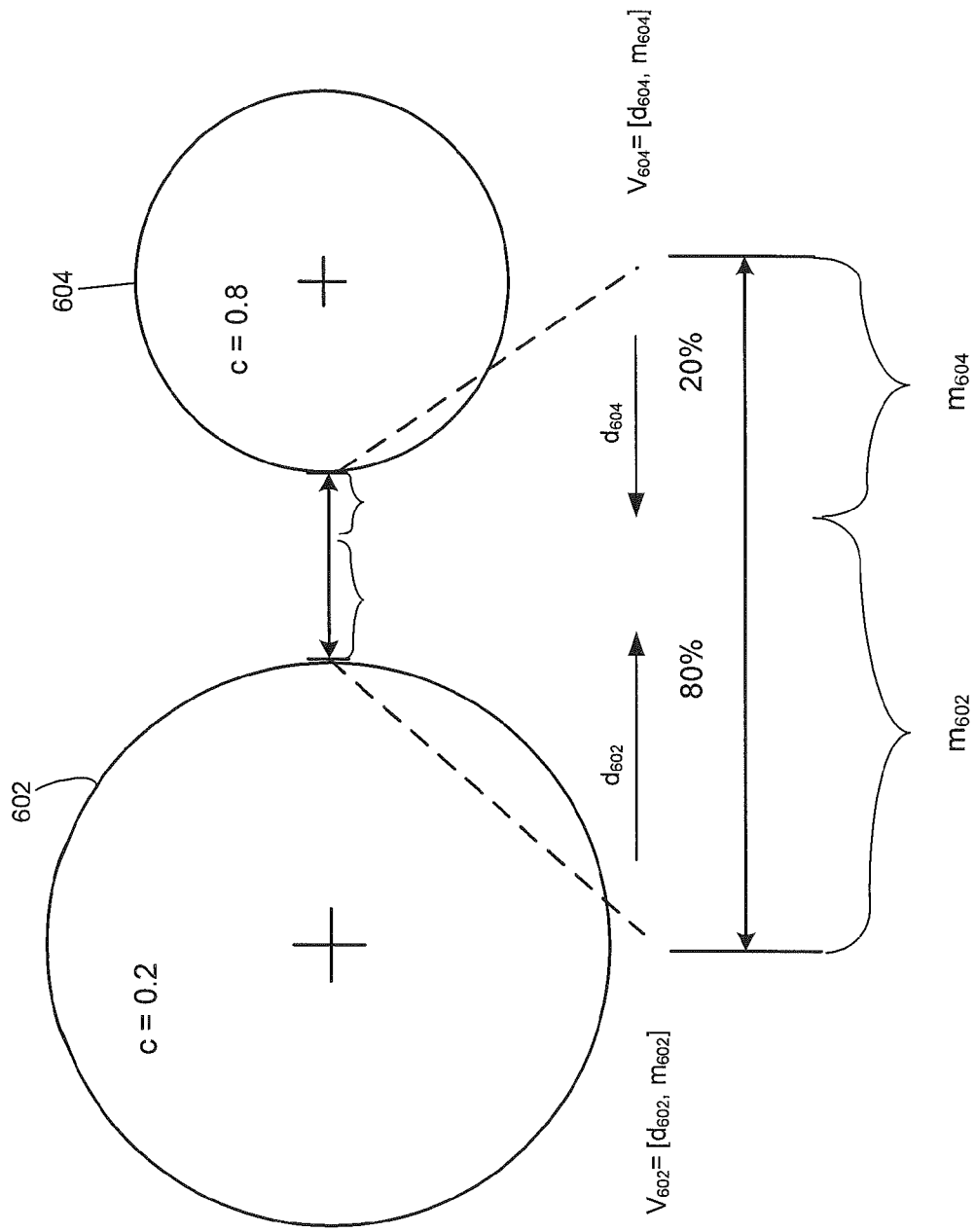
Figure 6D:
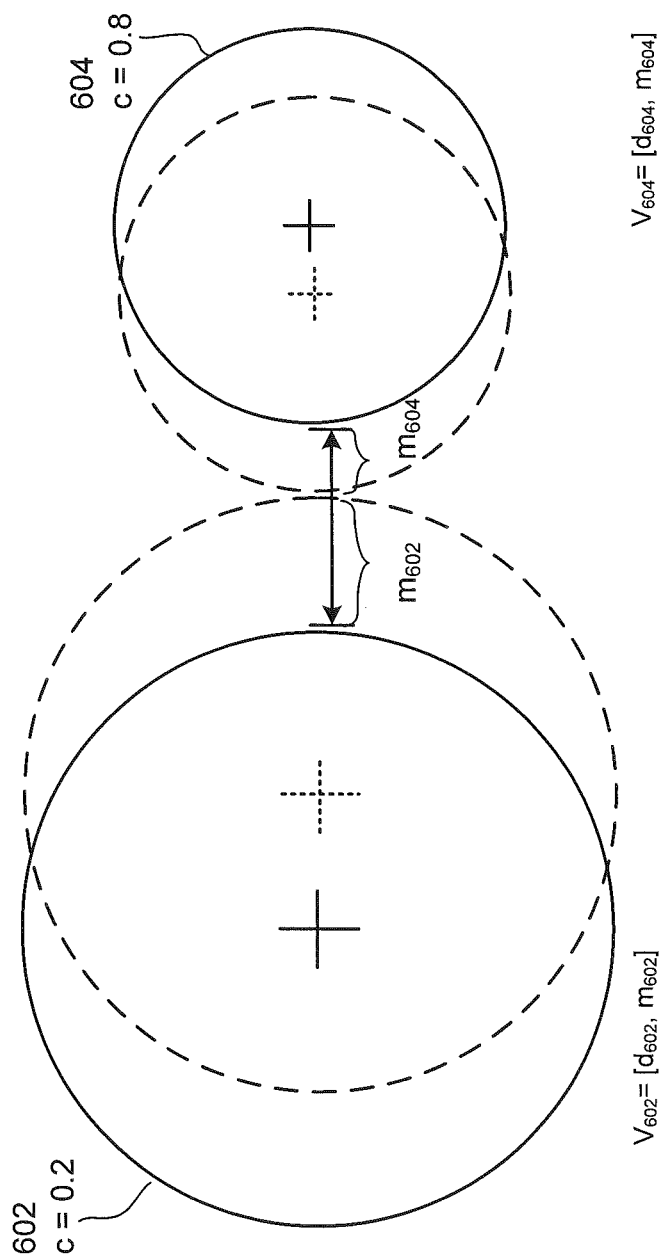
Figure 6E:
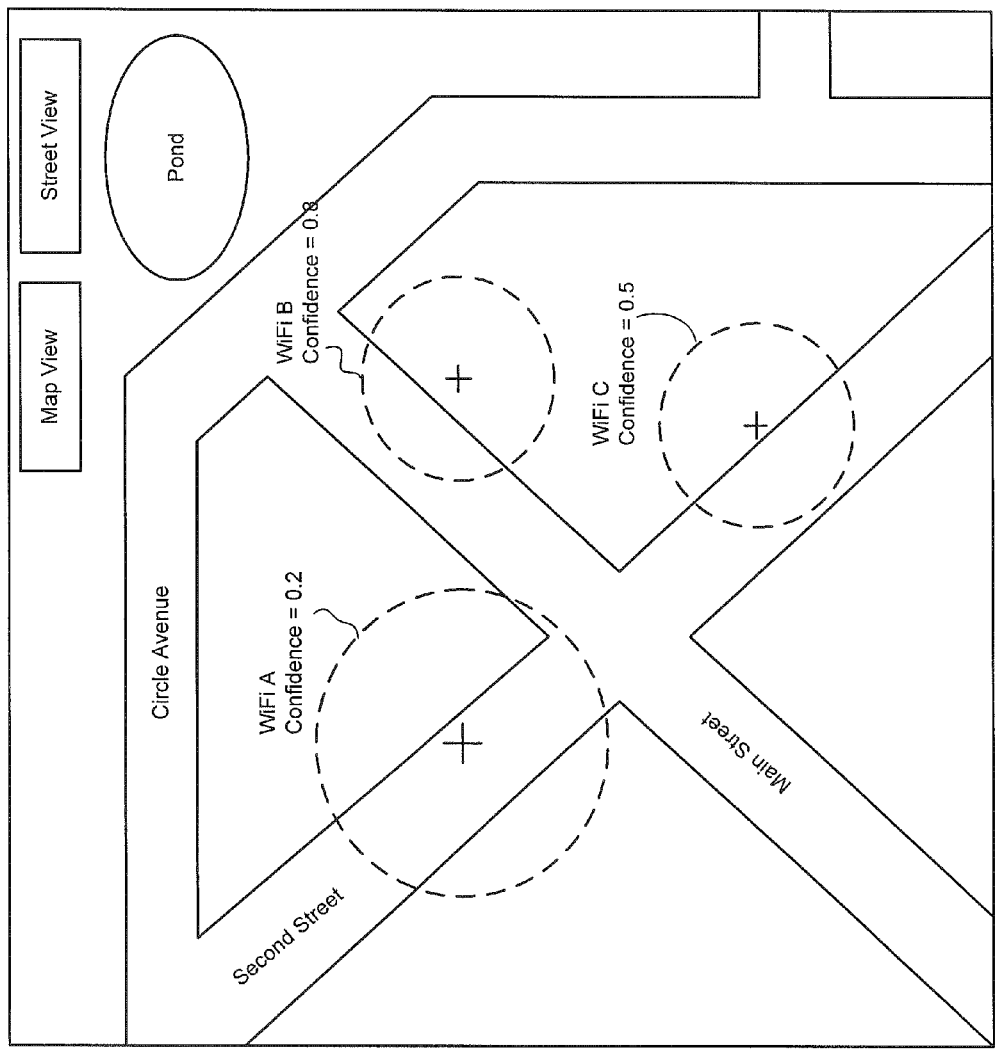

As illustrated in FIGS. 6C and 6D, the magnitude over which to shift the coverage range may be set to be proportional to the gap distance between the two coverage circles in each pair, and proportional to the confidence value of the other coverage circle. Thus, if the confidence levels of access points 602 and 604 are 0.2 and 0.8, respectively, the ratio of the magnitudes to shift circle 602 ($m_{602}$) and the magnitude to shift circle 604 ($m_{604}$) is 0.8:0.2. FIG. 6D shows that each range circle is moved to its new location. The allowed distance and magnitude change in each iteration may be a function of an delta value. As explained below, the delta value and the allowed change in centroid location and range radius may be set to monolithically decline as the global error of the system declines in each iteration.

Figure 6F:
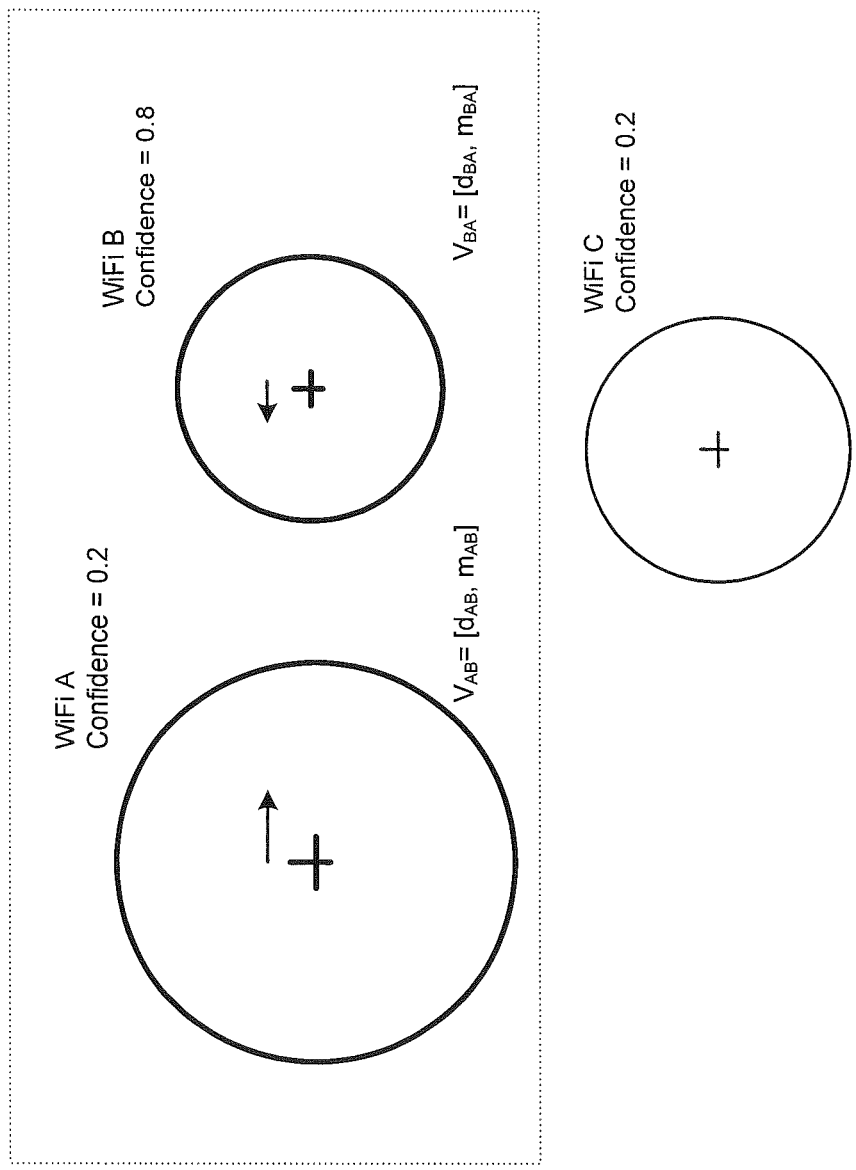
Figure 6G:
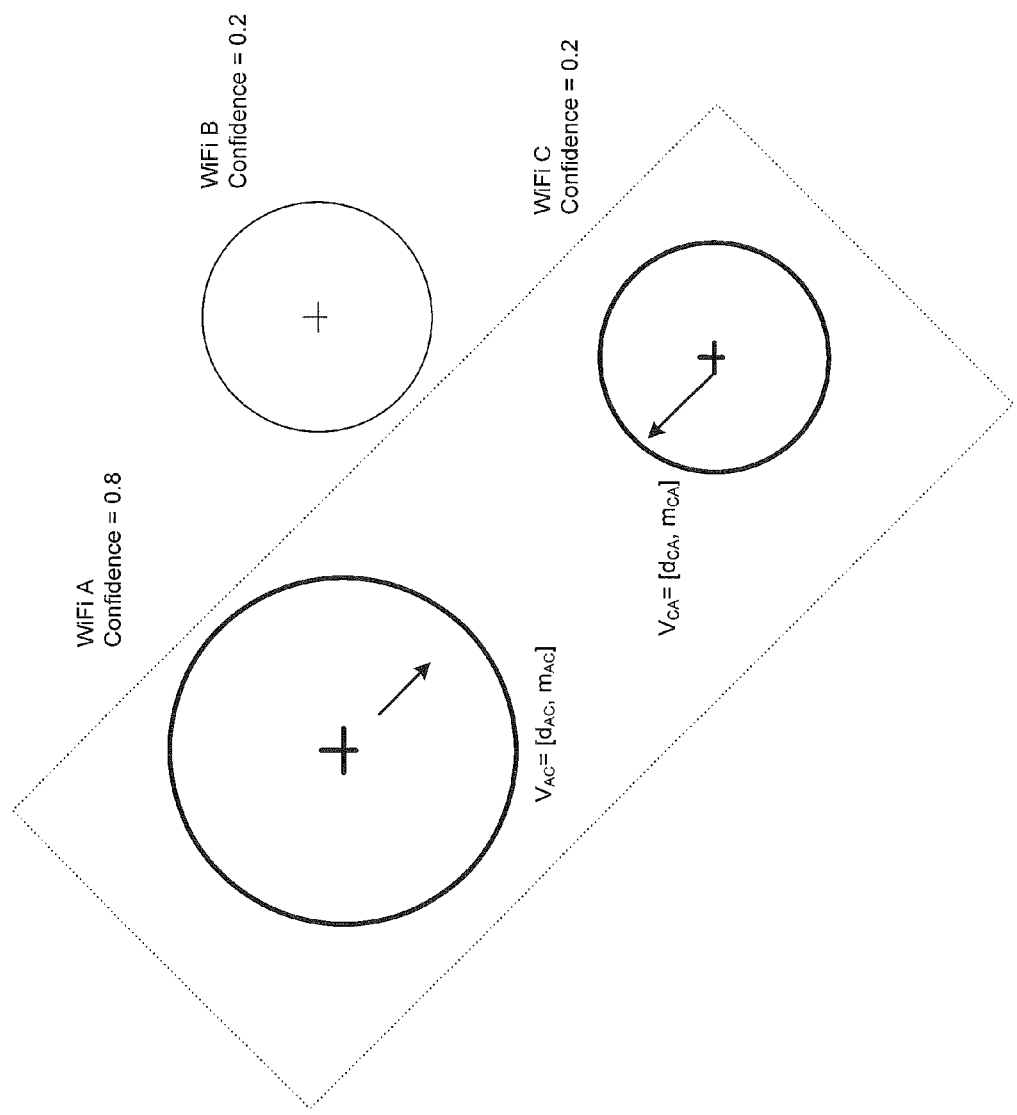
Figure 6H:
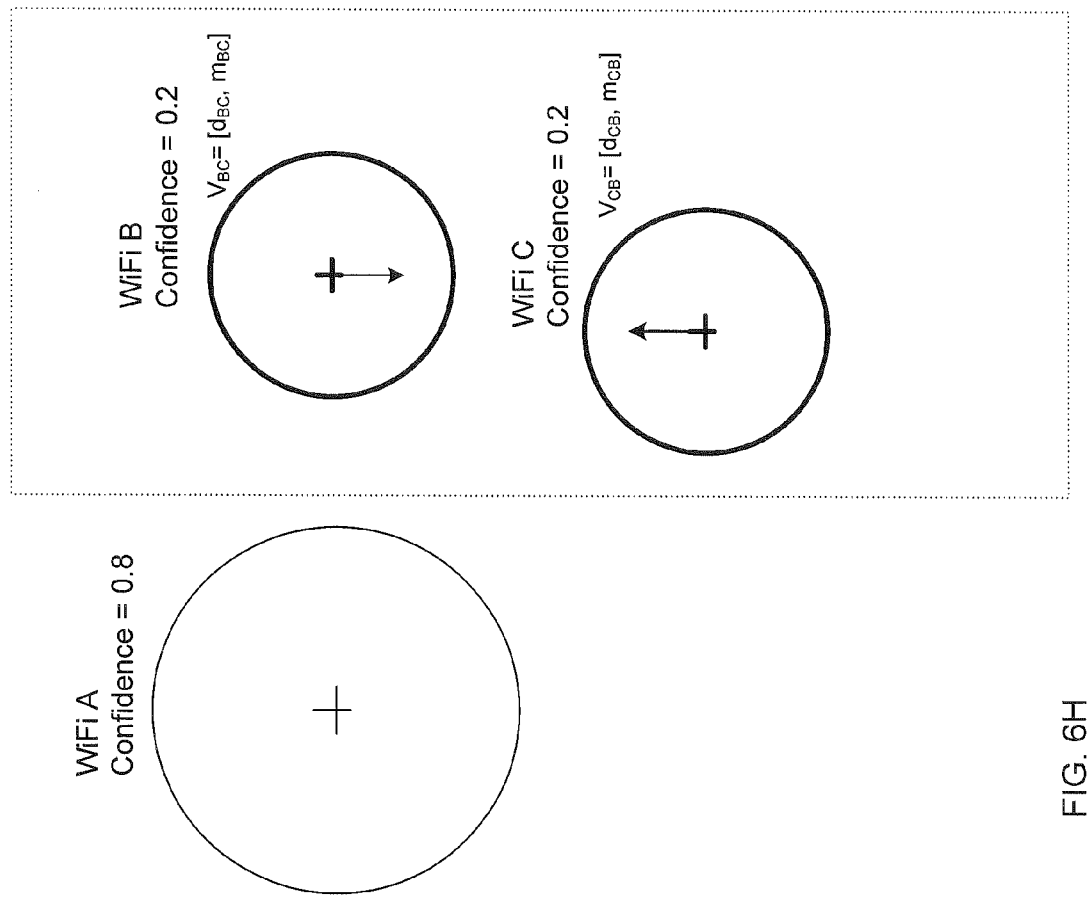

FIG. 6E-K shows a scenario of improving location and range data for three WiFi access points, WiFi A-C, that are close but with no overlapping range. In this scenario, each access point may be grouped into pairs with the other two points. Thus, three pairs of access points are identified. As shown in FIG. 6F, WiFi A and WiFi B are grouped into a pair and a vector is determined for each access point: $V_{AB}=[d_{AB}, m_{AB}]$ and $V_{BA}=[d_{BA}, m_{BA}]$. FIG. 6G shows that WiFi A and WiFi C are grouped into a pair and each associated vector is: $V_{AC}=[d_{AC}, m_{AC}]$ and $V_{CA}=[d_{CA}, m_{CA}]$. FIG. 6H shows that WiFi B and WiFi C are grouped into a pair and a vector is determined for each access point: $V_{BC}=[d_{BC}, m_{Bc}]$ and $V_{CB}=[d_{CB}, m_{CB}]$.

Figure 6I:
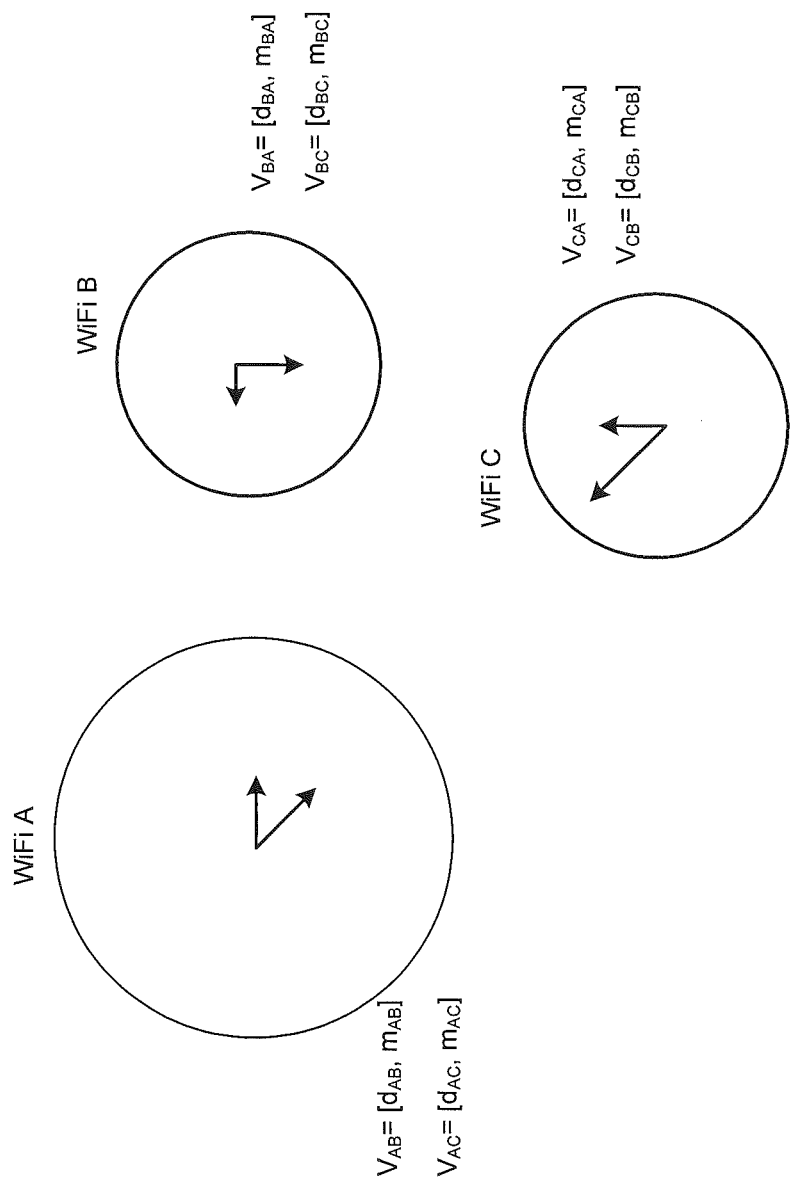
Figure 6J:
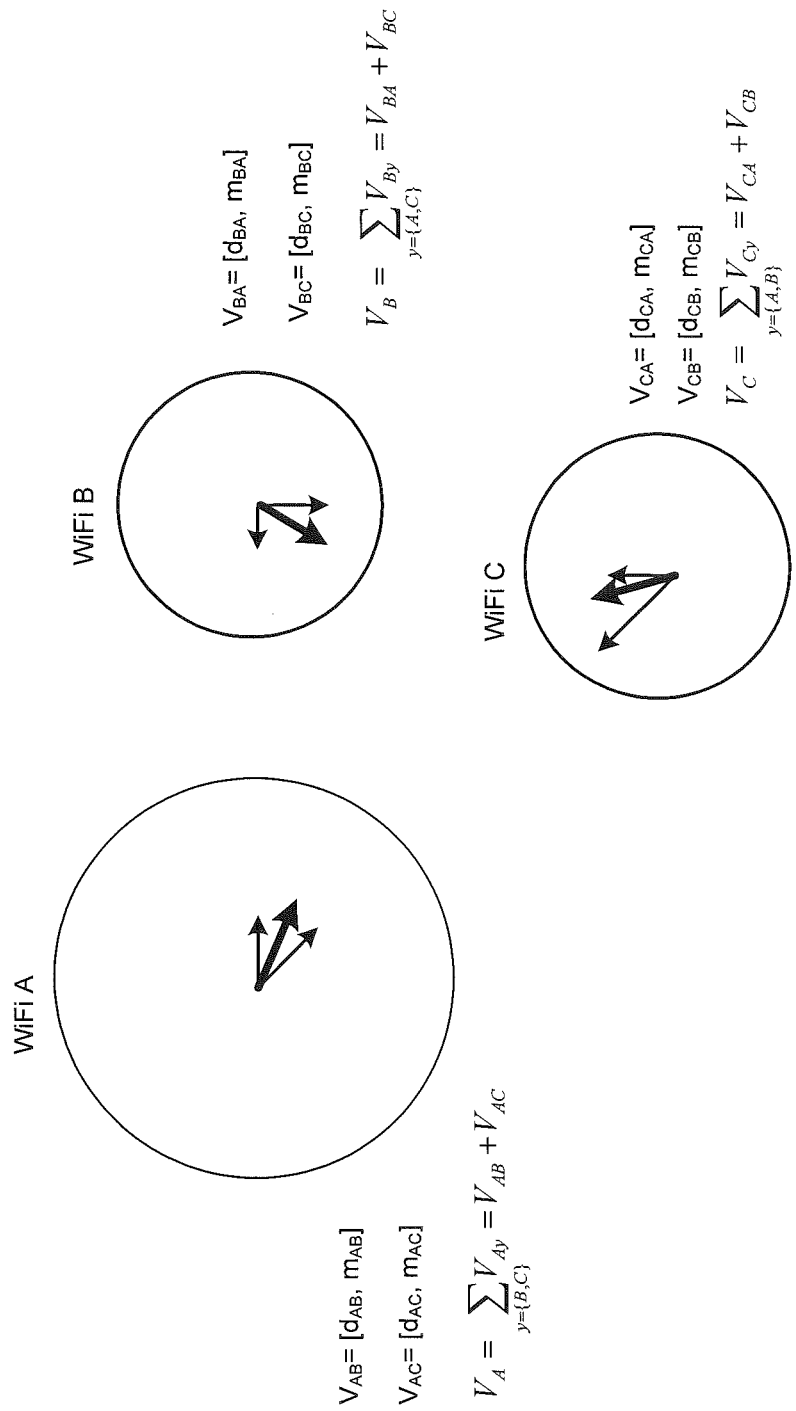

After the vector for each access point in each identified pair is determined, the vectors for each access point are aggregated and normalized in step 412. Turning to FIGS. 6I and 6J, for example, the vector for WiFi A is determined to be $$V_A = \sum_{y=\{B,C\}} V_{Ay} = V_{AB} + V_{AC},$$

the vector for WiFi B is $$V_B = \sum_{y=\{A,C\}} V_{By} = V_{BA} + V_{BC},$$

and the vector for WiFi C is $$V_C = \sum_{y=\{A,B\}} V_{Cy} = V_{CA} + V_{CB}.$$

Figure 6K:
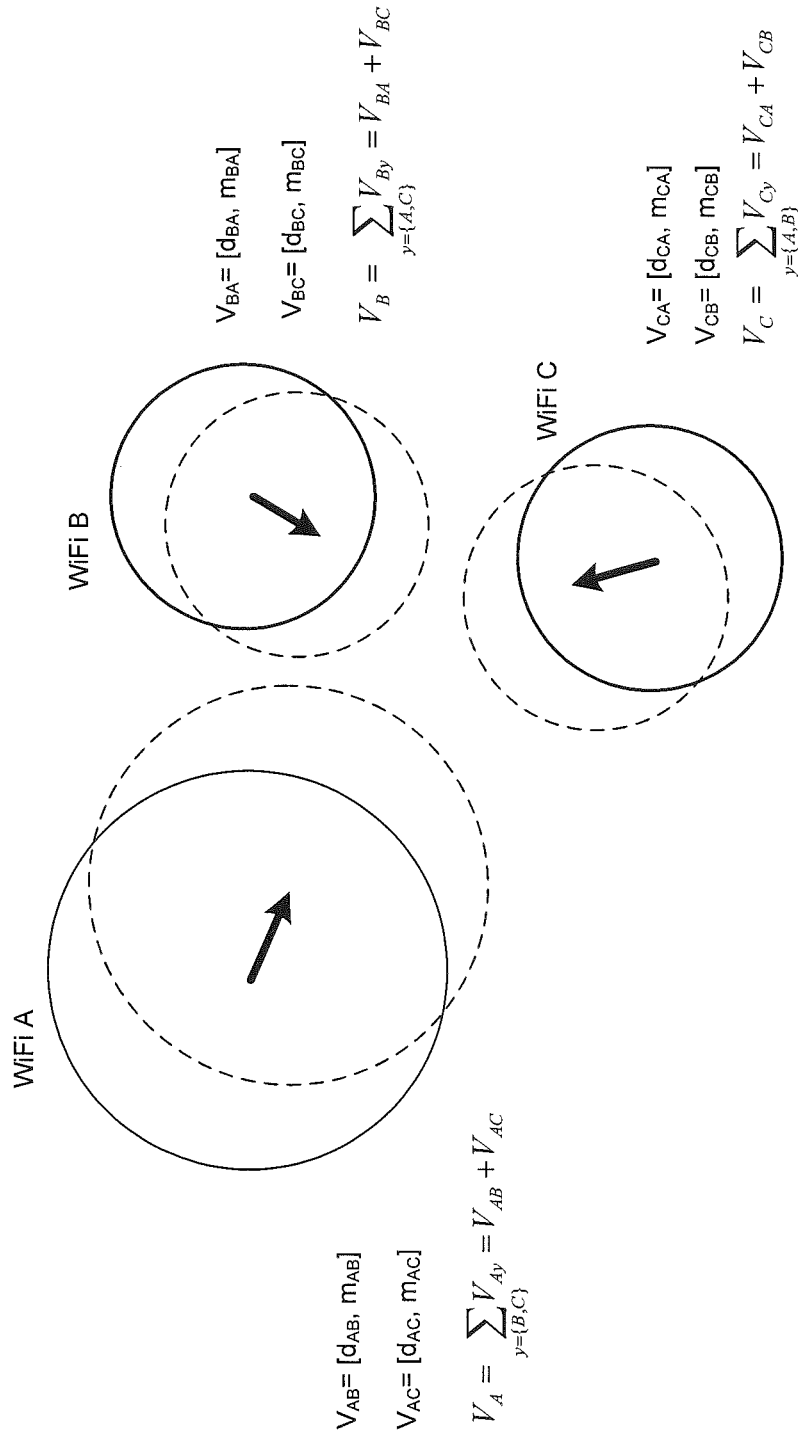

The normalized vector for each signal determines the final direction and distance over which the signal coverage circle will be shifted to the new location of the coverage circles. In step 414, the coverage circles are moved according to the aggregated vector, as shown in FIG. 6K.

Then, in step 416, the system adjusts the radius of the newly located range circles by making the range circles to cover the existing data with equivalent confidence interval. By way of example, if existing confidence level of an access point is formulated to be 0.8 in the sense that 80% of raw GPS points associated with the access point are covered by existing coverage range of the access point, the radius adjustment process may adjust the newly located range circle to a minimum radius to cover 80% of raw GPS points associated with the access point. Process 400 accommodates various radius adjustment processes, which may be designed in accordance with the methods and systems of determining confidence levels.

Then in step 418, the system measures, for each access point, the degree of overlap with its neighbors. All the neighbor access points are surveyed for each access point under study. Degree of overlap may be based on various criteria. In one example, the degree of overlap may be determined by the number of neighbor access points that overlap with the range of the access point being studied. In another example, the degree of overlap may be based on a relative frequency of two or more access points that appear in a same scan.

Then the range circle radius of the access point being studied may be adjusted according to the degree of overlap. In one aspect, if the access point is determined to have little overlap with known neighbor access points in step 420, the range circle radius may be underestimated and thus may be increased by a delta amount in step 424. If the access point is determined to have too much overlap with unknown neighbor signals in step 422, the radius of the signal being surveyed may be overestimated due to bias or noise in the sample data, and the radius may be reduced by a delta amount in step 426. The delta amount may be a value chosen from or determined based on a set of empirical data in step 436. For example, the initial delta amount may be set high to overcome possible local optima and may gradually decrease in each iteration. In both the underestimation and the overestimation situations above, the system may, in step 434, optionally decrease the confidence level of the access point being studied.

Then in step 428, the system measures the global error of the present iteration process. In one aspect, the global error may be found through a function of the sum of gap distances between pairs of adjacent signals.

The goal of each iteration is to minimize the global error. As explained above, the process of optimizing the access point location and the range data may be implemented through a process that minimizes the error. As the iteration counts progress, the global error will decline and finally the system may obtain a global optimum value of the new location and radius for each signal.

Figure 6L:
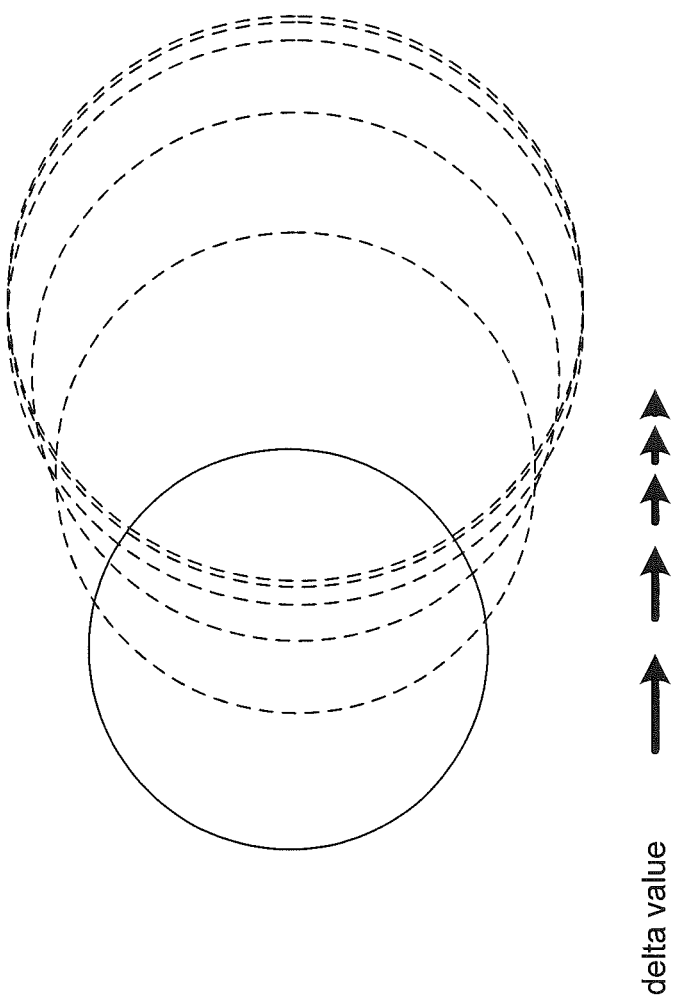

In one aspect, the delta value and the allowed change in the location and radius may be set to be monolithically declining as the iteration progress. In one aspect, the selection of the initial delta value may be a function of empirical observations. The speed at which the process converges may be controlled by setting the initial delta change value. If the delta is set relatively high at the beginning, the optimization process may converge relatively fast and may need less iterations. If the initial delta value is chosen to be low at the beginning, the process may converge relatively slowly and may need more iterations. FIG. 6L shows that the declining change in the location and radius in each iteration.

The process may be set to terminate when the improvement to the global error or the allowed delta changes becomes insignificant or falls below certain threshold values after an iteration. Thus, in step 430, the process may stop if it is determined that either the delta change or the overall error is sufficiently small.

The use of an error minimization process could help the system escape from a local minima error and bump the system to the global minimum. In other words, an uphill move of system error may be permitted in this process, albeit with decreasing probability for larger differences as iteration counts progress.

Although FIG. 4 shows that process 400 starts upon the system receiving a location query with a list of detected access points, as discussed before, process 400 may be scheduled periodically to globally or locally optimize the location and range data of access points in a database. In a global optimization scenario, process 400 may be performed for all access point data on a server side. In a local optimization scenario, process 400 may be performed for certain amount of access point data and on either the server side or client side.

FIG. 5 is a flowchart of a location estimation process 500 in accordance with aspects of the invention. The details of the process 500 will be explained below with reference to FIGS. 7A-E. In step 502, the system may receive a location query from a client device or otherwise initiate the process. As explained above, the query transmitted to the system includes a list of scanned neighbor WiFi access points. In step 504, the system may, based on the location and coverage range information, determine the number of intersections with neighboring access points for each access point. The location and coverage ranges used in process 500 may have been optimized by process 400.

Figure 7A:
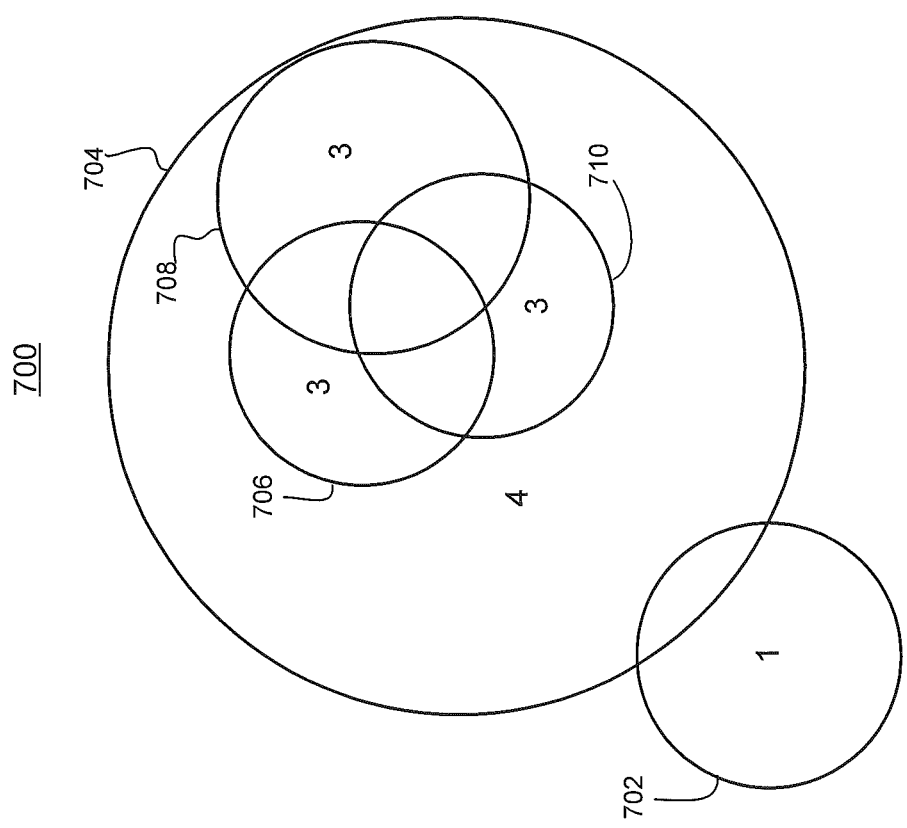
FIG. 7A-E illustrates scenarios in accordance with aspects of the invention.

For example, in FIG. 7A, access point 702 intersects with access point 704 and therefore 702 has only 1 intersection. Access point 704 intersects with access points 702, 706, 708 and 710 and therefore has 4 intersections. Access point 706 intersects with access points 704, 708 and 710 and thus the number of intersections for 706 is 3. As illustrated, the number of intersections for access points 708 and 710 are also 3.

Figure 7B:
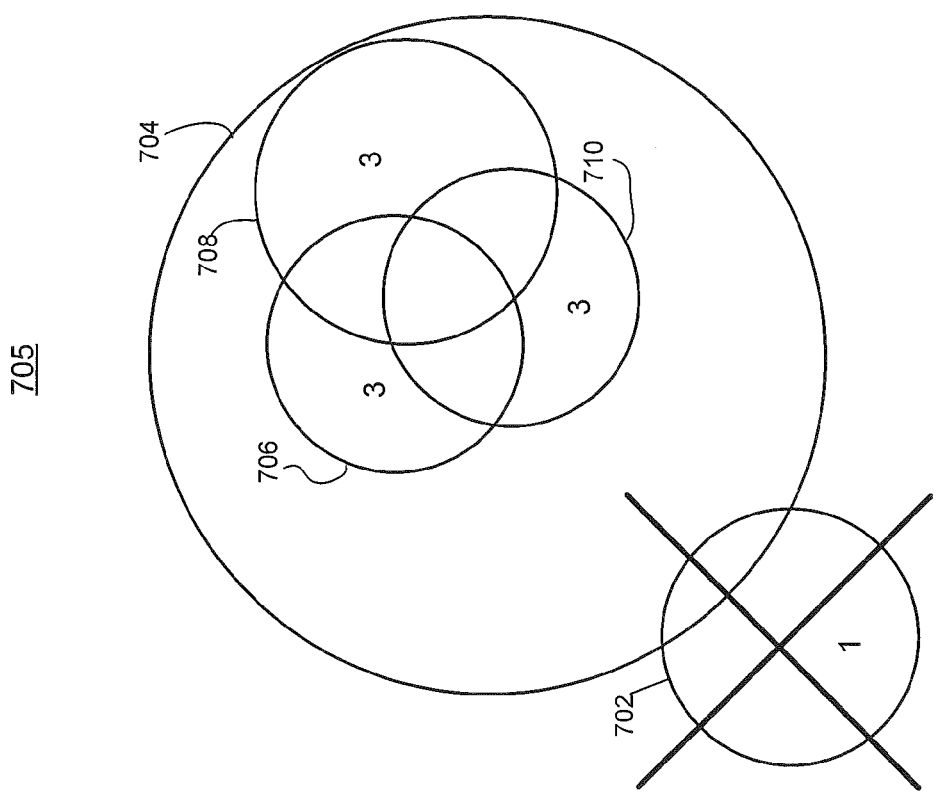

In step 506, the system removes from further processing the outlier access point having the number of intersections that equals to the lower amount of intersections among all the access points. The system also recalculates the number of intersections for all the remaining access points. Thus, as shown in FIG. 7B, access point 702 is discarded from further processing and the number of intersections for access points 704-710 all become 3. In step 508, the system determines if each overlapping access point has the same number of intersections. The system repeats removing the access point with the fewer number of intersections until all overlapping access points have the same number of intersections.

Figure 7C:
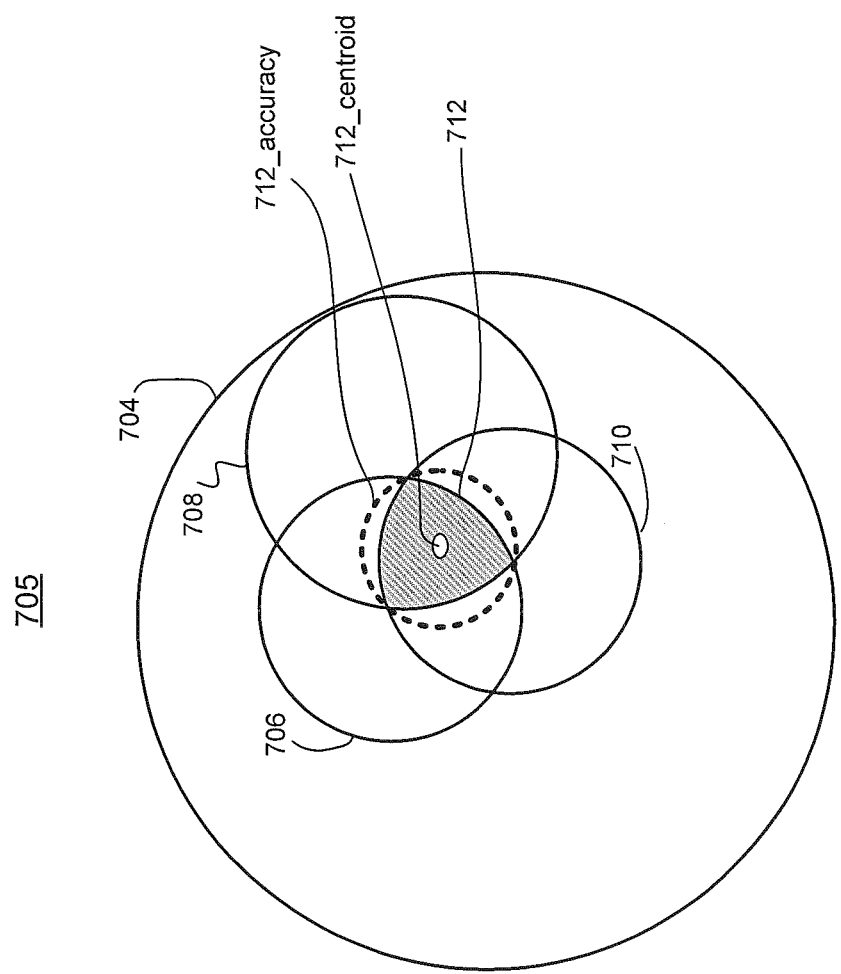

In step 510, the system determines if all the access points intersect. In most situations, the access point removal loop above cuts the access points down to a set of access points that all intersect with each other. For example, as shown in scenario 705 of FIGS. 7B-C, the remaining access points 704-710 all intersect with each other. Then, in step 512, the center of the intersection may be calculated and determined to be the client device's location. The accuracy range of the location may be determined to be a circle covering the intersection. Referring to FIG. 7C, 712 is the intersection of all the remaining range access points 704-710. 712_centroid will be returned to the client device as the location centroid and 712_accuracy is retuned as the accuracy circle. Referring back to FIG. 2C, 712_centroid and 712_accuracy may be displayed on the client device as the 270_location and 270_location_accuracy on the client device.

Figure 7D:
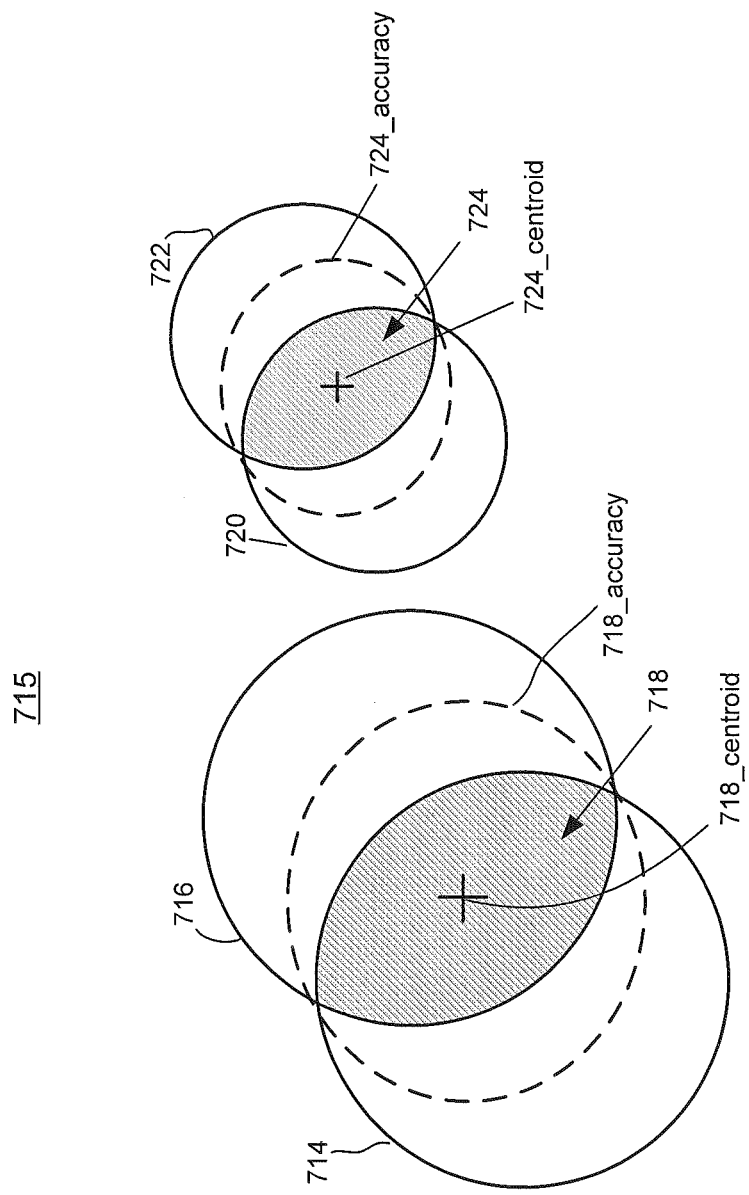
Figure 7E:
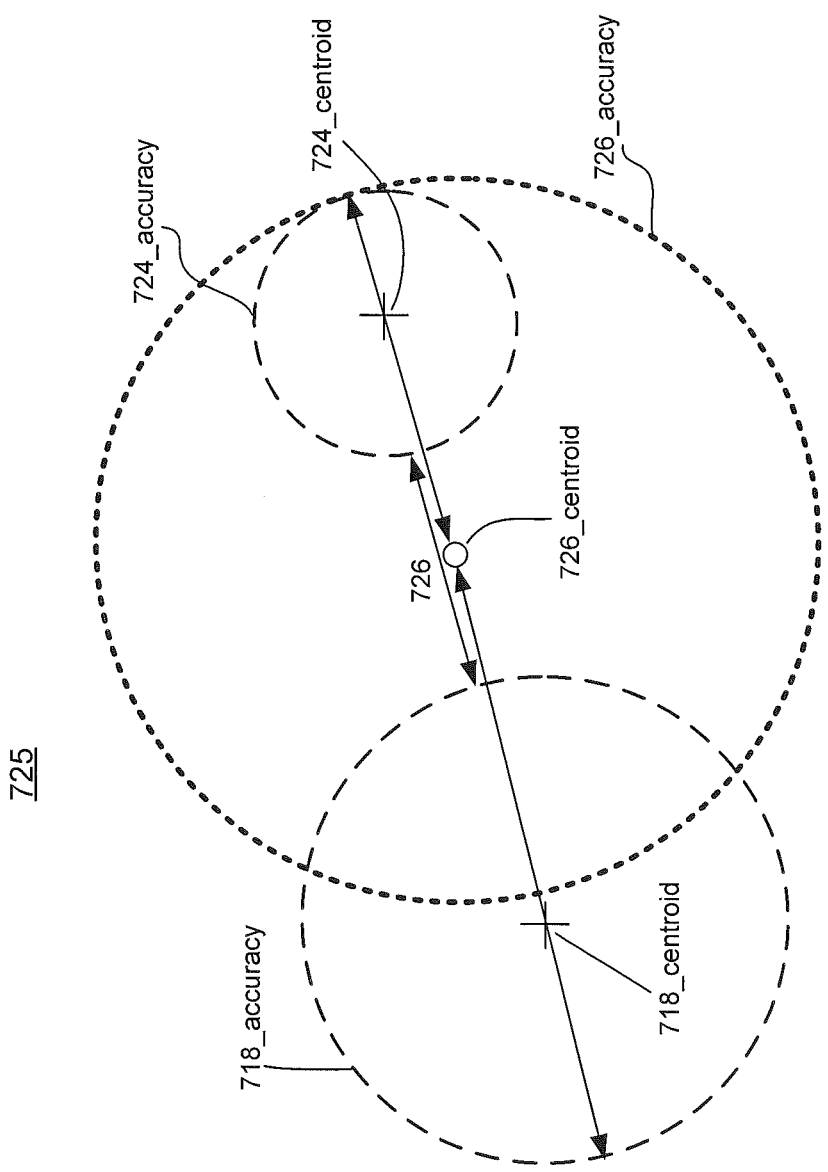

In another aspect, the above iteration of removing outlier access points may result in a list of coverage ranges that do not all intersect with each other. FIG. 7D illustrates such a situation 715. Here access points 714 and 716 overlap, and access points 720 and 722 overlap. Referring back to FIG. 5, the system determines in step 510 that not all access points overlap in scenario 715. Proceeding to step 514, the system divides the access points into separate groups where in each group all the access points intersect. In step 516, the system determines the center of the intersection in each group and an accuracy circle as in step 512. For example, in FIG. 7D, 718_accuracy with 718_centroid as the circle center is determined based on the intersection 718 of the access points 714 and 716. 724_accuracy with 724_centroid as the circle center is determined based on the intersection 724 of the access points 720 and 722. Thus, in scenario 715, two non-overlapping circles 718_accuracy and 724_accuracy are obtained.

Then in step 518, the system may calculate the centroid of the distance between the edges of the non-overlapping circles and designate it as the location to return. The accuracy circle of the location may be determined to cover the center of the nearest non-overlapping circle. For example, in scenario 725 of FIG. 7E, the distance 726 between 718_accuracy and 724_accuracy is measured. 726_centroid is determined to be the client device's location. Since circle 724_accuracy is closer to 726_centroid than circle 718_accuracy, the accuracy circle 726_accuracy to be returned to the client device is determined to have a radius with the distance between 726_centroid to 724_centroid.

Systems and methods in this invention are not limited to WiFi access points, but may be used with any device that transmits a signal, e.g., cellular telephone towers and base stations or Bluetooth-enabled devices, or any combination of the signal data transmitted by various types of signal sources.

It will be further understood that the sample values, types and configurations of data described and shown in the figures are for the purposes of illustration only. In that regard, systems and methods in accordance with aspects of the invention may include various types of networks, transmission devices, client devices, servers, data values, data types and configurations, and different error propagation techniques. The systems and methods may be provided and received at different times (e.g., via different servers or databases) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any technology for determining the location of an access point may be employed in any configuration herein. Each way of determining the confidence level may be used in any configuration herein. Any mobile client device may be used with any of the configurations herein.

The invention claimed is:

1. A method of estimating coverage range and location for a transmitting station in a wireless network having a plurality of transmitting stations, the method comprising:
   dividing, by a processor, the plurality of transmitting stations into a plurality of pairs based on existing coverage range and location data, each transmitting station being in at least one of the plurality of pairs; and
   estimating a new coverage range and a new location for each of the plurality of transmitting stations based on a confidence level associated with each transmitting station, a distance to another transmitting station in a given one of the plurality of pairs, and a coverage range overlap with other ones of the transmitting stations,
   wherein estimating the new location for a given one of the transmitting stations comprises calculating a distance and a direction to shift the given transmitting station towards the other transmitting station in the given pair, the distance being proportional to the confidence level of the other transmitting station in the given pair and proportional to the distance between the coverage ranges of the transmitting stations in the given pair.

2. The method of claim 1, wherein the coverage ranges of the transmitting stations in each pair do not overlap.

3. The method of claim 1, further comprising summing the distances and directions calculated for each transmitting station in each pair.

4. The method of claim 1, wherein estimating the new coverage range for a given one of the transmitting stations comprises determining an overlap of the given transmitting station with other transmitting stations, the overlapping transmitting stations including transmitting stations on a neighbor list of the given transmitting station and transmitting stations not on the neighbor list.

5. The method of claim 4, further comprising adjusting the new coverage range for the given transmitting station by increasing the new coverage range for the transmitting station by a first amount if the overlap with the transmitting stations on the neighbor list is below a predetermined threshold, and decreasing the new coverage range by a second amount if the overlap with the transmitting stations not on the neighbor list is above a predetermined threshold.

6. The method of claim 5, further comprising:
   measuring the distance between every two transmitting stations after adjusting the coverage range;
   summing all the measured distances; and
   determining if the sum of the measured distances is above a predetermined threshold.

7. The method of claim 6, further comprising setting the first amount and the second amount in each round of estimation based on the sum of the measured distances.

8. The method of claim 1, further comprising determining a confidence level for each transmitting station prior to estimating the new coverage range and the new location.

9. An apparatus for estimating coverage range and location for a transmitting station in a wireless network having a plurality of transmitting stations, the apparatus comprising:
   memory for storing coverage range information and location information for the plurality of transmission station; and
   a processor configured to:
   divide the plurality of transmitting stations into a plurality of pairs based on the stored coverage range and location data, each transmitting stations being in at least one pair; and
   estimate a new coverage range and location for each transmitting station based on a confidence level associated with each transmitting station, a distance to another transmitting station in a given pair, and a coverage range overlap with other transmitting stations,
   wherein estimating the new location for a given one of the transmitting stations comprises calculating a distance and a direction to shift the given transmitting station towards the other transmitting station in the given pair, the distance being proportional to the confidence level of the other transmitting station in the given pair and proportional to the distance between the coverage ranges of the transmitting stations in the given pair.

10. The apparatus of claim 9, wherein the coverage ranges of the transmitting stations in each pair do not overlap.

11. The apparatus of claim 9, wherein the processor is further configured to sum the distances and directions calculated for each transmitting station in each pair.

12. The apparatus of claim 9, wherein estimating the new coverage range for a given one of the transmitting stations comprises determining an overlap of the given transmitting station with other transmitting stations, the overlapping transmitting stations including transmitting stations on a neighbor list of the given transmitting station and transmitting stations not on the neighbor list.

13. The apparatus of claim 12, wherein the processor is further configured to adjust the new coverage range for the given transmitting station by increasing the new coverage range for the transmitting station by a first amount if the overlap with the transmitting stations on the neighbor list is below a predetermined threshold, and decreasing the new coverage range by a second amount if the overlap with the transmitting stations not on the neighbor list is above a predetermined threshold.

14. The apparatus of claim 13 wherein the processor is further configured to:
measure the distance between every two transmitting stations after adjusting the coverage range;
sum all the measured distances; and
determine if the sum of the measured distances is above a predetermined threshold.

15. The apparatus of claim 14, wherein the processor is further configured to set the first amount and the second amount in each round of estimation based on the sum of the measured distances.

16. The apparatus of claim 9, wherein the processor is further configured to determine a confidence level for each transmitting station prior to estimating the new coverage range and the new location.

17. A method of estimating a location of a device in a wireless network including a plurality of transmission stations each having a coverage range, the method comprising:
detecting, at the device, the plurality of transmission stations;
dividing the plurality of transmitting stations into a plurality of pairs based on existing coverage range and location data, each transmitting station being in at least one pair, wherein coverage ranges of the transmitting stations in each pair do not overlap;
estimating, for each transmission station in each pair of transmitting stations, a new coverage range and a new location for the transmitting station based on confidence levels associated with the transmitting stations in the pair and a distance between the coverage ranges of the transmitting stations in the pair;
determining, for each of the plurality of transmission stations, a number of intersections with other ones of the plurality of transmission stations based on the estimated new coverage range of each transmission station;
identifying a given one of the transmission stations having a least number of intersections;
removing the identified given transmission station from further estimation when the number of intersections for each remaining transmission station in the plurality of transmission stations is not the same; and
determining the location of the device and an accuracy range of the location based on the intersections of all remaining transmission stations.

18. The method of claim 17, wherein estimating the new location for a given one of the transmitting stations comprises:
calculating a distance and a direction to shift the given transmitting station towards the other transmitting station in a given pair, the distance being proportional to the confidence level of the other transmitting station in the given pair and proportional to the distance between the coverage ranges of the transmitting stations in the given pair; and
summing the distances and directions calculated for each transmitting station in each pair.

19. The method of claim 17, wherein determining the location of the device includes determining a centroid of the intersection of all remaining transmission stations to be the location of the device, wherein determining the accuracy range of the location includes determining a circular area covering the intersection, and wherein the determined location being assigned as the center of the circular area.

20. The method of claim 17, wherein determining the location of the device comprises:
dividing the remaining transmission stations of the set into a first group and a second group, wherein in each group all transmission stations intersect with each other, and wherein the transmission stations in the first group do not intersect with the transmission stations in the second group;
determining a centroid of the intersection in each group;
determining a circular area in each group covering the intersection, the circular area having the determined centroid as its center;
determining a new centroid between edges of the determined circular areas of the first and second groups as the location of the device; and
determining a new circular area to be the accuracy range of the determined location, the determined location being assigned as the center of the new circular area, the new circular area covering the circular area from whichever group that is the closest to the determined location.

* * * * *